(12) United States Patent
Vedantam et al.

(10) Patent No.: US 11,861,916 B2
(45) Date of Patent: Jan. 2, 2024

(54) DRIVER ALERTNESS MONITORING SYSTEM

(71) Applicant: Yazaki Corporation, Tokyo (JP)

(72) Inventors: Sai Anitha Kiron Vedantam, Camarillo, CA (US); Sivashankar Yoganathan, Moorpark, CA (US); Anand Ganesan Kaygee, Oak Park, CA (US)

(73) Assignee: YAZAKI CORPORATION, Tokyo (JP)

(*) Notice: Subject to any disclaimer, the term of this patent is extended or adjusted under 35 U.S.C. 154(b) by 57 days.

(21) Appl. No.: 17/494,482

(22) Filed: Oct. 5, 2021

(65) Prior Publication Data

US 2023/0119137 A1  Apr. 20, 2023

(51) Int. Cl.
*G06V 20/59* (2022.01)
*G08B 21/06* (2006.01)

(52) U.S. Cl.
CPC ........... *G06V 20/597* (2022.01); *G08B 21/06* (2013.01)

(58) Field of Classification Search
CPC .............................. G06V 20/597; G08B 21/06
See application file for complete search history.

(56) References Cited

U.S. PATENT DOCUMENTS

| | | | |
|---|---|---|---|
| 5,682,144 A * | 10/1997 | Mannik | G08B 21/06 340/576 |
| 6,097,295 A * | 8/2000 | Griesinger | A61B 5/18 340/576 |
| 6,496,117 B2 | 12/2002 | Gutta et al. | |
| 6,927,694 B1 | 8/2005 | Smith et al. | |
| 7,202,792 B2 | 4/2007 | Zhang et al. | |
| 7,680,302 B2 | 3/2010 | Steffin | |
| 7,719,431 B2 | 5/2010 | Bolourchi | |
| 7,909,128 B1 * | 3/2011 | Pontillo | B60K 28/063 340/576 |
| 8,264,531 B2 | 9/2012 | Jung et al. | |
| 8,314,707 B2 | 11/2012 | Kobetski et al. | |
| 8,698,639 B2 * | 4/2014 | Fung | B60T 8/172 340/576 |
| 9,662,977 B2 | 5/2017 | Kapuria et al. | |
| 9,925,872 B1 * | 3/2018 | Alasry | B60W 50/12 |
| 9,931,976 B1 * | 4/2018 | Terwilliger | H04W 4/40 |
| 10,875,536 B2 * | 12/2020 | Fung | A61B 5/1122 |
| 11,269,420 B1 * | 3/2022 | Marti | G06V 20/58 |
| 11,520,460 B1 * | 12/2022 | Flachsbart | G06F 3/0482 |

(Continued)

FOREIGN PATENT DOCUMENTS

| | | |
|---|---|---|
| EP | 1478268 | 11/2004 |
| EP | 2557549 | 2/2013 |
| WO | 2015175435 | 11/2015 |

*Primary Examiner* — Curtis J King
(74) *Attorney, Agent, or Firm* — Perkins Coie LLP; Jordan Becker

(57) ABSTRACT

A method for monitoring driver alertness in a vehicle is disclosed. Image data representing images of an eye of a driver are obtained, the images having been captured while the driver is operating the vehicle. An eye openness measure of the eye of the driver is computed, based on the image data. A determination is made that the driver is in an unsafe state for driving based on the eye openness measure, and an alert is generated, while the driver is operating the vehicle, based on determining that the driver is in the unsafe state.

24 Claims, 17 Drawing Sheets

(56) References Cited

U.S. PATENT DOCUMENTS

| | | | |
|---|---|---|---|
| 2002/0080495 A1* | 6/2002 | Anderson | G02B 27/0101 359/742 |
| 2002/0101354 A1* | 8/2002 | Banas | G08B 21/06 340/576 |
| 2004/0183685 A1 | 9/2004 | Strumolo et al. | |
| 2006/0214807 A1 | 9/2006 | Tengshe et al. | |
| 2006/0259206 A1* | 11/2006 | Smith | A61B 5/163 701/1 |
| 2007/0133884 A1* | 6/2007 | Hammoud | G08B 21/06 382/225 |
| 2012/0242819 A1* | 9/2012 | Schamp | G06V 20/597 348/78 |
| 2012/0271484 A1* | 10/2012 | Feit | B60W 40/04 701/1 |
| 2013/0010096 A1* | 1/2013 | S | G06F 3/013 348/78 |
| 2013/0021462 A1* | 1/2013 | Kadoya | A61B 5/18 348/78 |
| 2014/0152444 A1* | 6/2014 | Lee | G08B 21/06 340/575 |
| 2014/0240478 A1 | 8/2014 | Nachtegall et al. | |
| 2014/0276090 A1* | 9/2014 | Breed | A61B 5/1455 600/473 |
| 2015/0124068 A1* | 5/2015 | Madau | G08B 21/06 29/428 |
| 2015/0160726 A1* | 6/2015 | Sullivan | G06V 40/19 345/156 |
| 2015/0294169 A1 | 10/2015 | Zhou et al. | |
| 2015/0328985 A1 | 11/2015 | Kim et al. | |
| 2016/0314366 A1* | 10/2016 | Omi | G03B 3/02 |
| 2017/0088165 A1 | 3/2017 | Raphael et al. | |
| 2017/0160915 A1* | 6/2017 | Kim | B60N 2/02 |
| 2017/0240109 A1* | 8/2017 | Kimura | G08G 1/16 |
| 2018/0053103 A1* | 2/2018 | Delgado | G06V 40/19 |
| 2018/0093623 A1* | 4/2018 | Terwilliger | H04L 67/12 |
| 2019/0122044 A1* | 4/2019 | Noble | G06V 40/197 |
| 2019/0139233 A1* | 5/2019 | Das | G06T 7/73 |
| 2019/0143989 A1* | 5/2019 | Oba | G06V 40/19 701/70 |
| 2019/0279008 A1* | 9/2019 | Abhau | G06T 7/70 |
| 2019/0299830 A1* | 10/2019 | Alequin | B60N 2/56 |
| 2020/0005060 A1* | 1/2020 | Martin | G06V 20/597 |
| 2020/0128902 A1* | 4/2020 | Brown | A42B 3/042 |
| 2020/0207358 A1* | 7/2020 | Katz | G01C 21/3697 |
| 2020/0210733 A1* | 7/2020 | Noble | G06T 7/593 |
| 2021/0221404 A1* | 7/2021 | Reiner | G06V 40/28 |
| 2022/0111792 A1* | 4/2022 | Burmistrov | B60W 30/0956 |
| 2022/0118985 A1* | 4/2022 | Austin | G06N 20/00 |
| 2022/0327845 A1* | 10/2022 | Rundo | G06V 10/7715 |

* cited by examiner

DRIVER ALERTNESS MONITORING SYSTEM

FIELD

At least one embodiment of the present disclosure pertains to in-vehicle processing systems, and more particularly, to an in-vehicle driver alertness monitoring system.

BACKGROUND

Driver drowsiness, fatigue and distraction while driving are major sources of automobile accidents. According to the National Highway Traffic Safety Administration (NHTSA), about 100,000 police-reported crashes are the direct result of driver fatigue resulting in injuries, loss of life and $12.5 billion financial loss. In 2015, there were 824 fatalities that were related to drowsy driving.

There are many causes for driver drowsiness and distraction. Some of the significant contributors are medication, sleep disorder or poor night's rest and mobile devices. The European New Car Assessment Programme (Euro NCAP), the voluntary vehicle safety rating system, recently introduced "occupant status monitoring" rating as part of their 5-star rating categories. This rating requires the vehicle to monitor the alertness and the attention level of the driver. Automotive original equipment manufacturers and fleets are looking for innovative driver monitoring solutions that are cost effective and robust for automotive environment.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
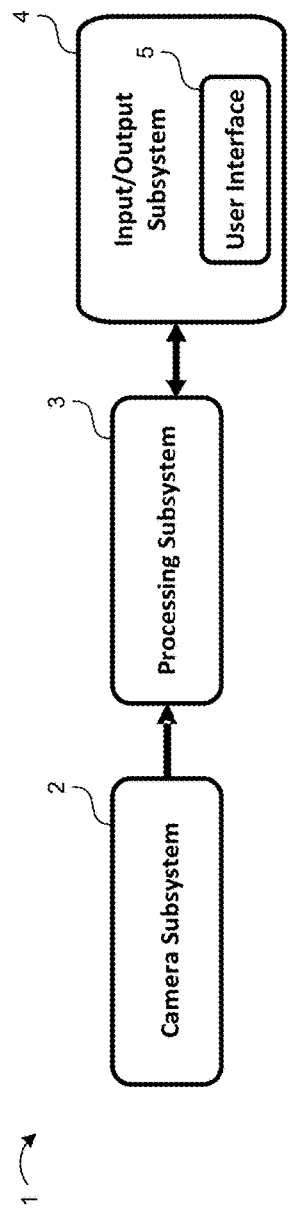
FIG. 1 is a high-level block diagram of an example of the physical structure of an in-vehicle driver alertness monitoring system.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

I. Overview

A driver monitoring system that can automatically detect gradual decrease in driver alertness and warn the driver early enough is an important step in reducing accidents on the roadway. Introduced here, therefore, is a camera-based driver monitoring system (DMS) that continuously monitors the head and eye movements of the driver and tracks the attention level of the driver. When the attention level progressively decreases with time, the DMS introduced here (hereinafter also called "the system") can interact with the driver to improve the driver's attention level. The system continuously captures images of the driver and applies computer vision and machine learning techniques to captured images to extract facial and eye features that can be used to track changes in the head and eye movement.

Implementing such a camera-based DMS that is cost effective and suitable for real time driving environment has many challenges. Some of the significant challenges are the impact of harsh lighting conditions, vibration due to vehicle movement and natural driver body movement on the captured images that are used to extract facial and eye features. The DMS introduced here includes a method for eye and face movement tracking that is robust and invariant to lighting, vibration and body movement.

The system uses computer vision and machine learning techniques to improve the safety and convenience of the in-car experience. The system includes three primary detection functions: drowsiness detection, distraction detection and gaze detection. These functions are developed by monitoring and tracking changes in the driver facial images. The system continuously tracks head, eyelid and pupil movements. It converts changes in head, eye and pupil movement to time series events. Machine learning and computer vision techniques are used to convert images captured by a Near InfraRed (NIR) camera to time series head and eye movement data for predicting drowsiness, distraction and gaze levels.

Computer vision and machine learning techniques are used to determine the location of landmarks in the face and eye region. The locations of the landmarks in the eye region are used to measure the openness level of the eye. This measured openness level is then converted to fully open, partially open, or closed eye state per image. The eye state is tracked continuously to detect measured parameters, such as eye blink count, blink rate, eye closure duration, eye open duration, speed of eyelid closure, and/or speed of eyelid opening. The system continuously monitors these parameters for any significant change from established constant threshold values or driver specific calibrated (profile) values.

Environmental changes, such as changing lighting condition, vehicle vibration, and body movement, can introduce errors in the detected location of the landmarks. These errors can significantly impact the accuracy of the measured openness level of the eye. The proposed system describes a method that can produce robust and invariant measurement of eye openness level. The proposed approach is robust to variation in distance of the driver's head from camera; yaw, roll and pitch orientation of the head; and human variations such as race, ethnicity, gender, and age. The system can use deep learning and computer vision techniques to measure the eye openness level to improve robustness against lighting and vibration changes, road environment, and human head movements.

II. Example Implementation

The system measures the alertness level of the driver by evaluating a sequence of images captured by a camera and measuring the openness level of the eye, and head orientation. The openness level of the eye is converted to eye state. Eye state in turn is used to detect a collection of parameters such as blink count, blink duration, eye open duration, eye close duration, speed of eye opening, and speed of eye closure. These measured parameters along with head orientation (yaw, pitch and roll) are used to determine the alertness level of the driver.

FIG. 1 illustrates at a high level the hardware configuration of the system according to at least some embodiments. As shown, the system 1 includes an image capture and store subsystem (also called camera subsystem) 2, a processing subsystem 3 and an input/output (I/O) subsystem 4. The camera subsystem 2 includes at least one camera (e.g., a near-IR camera), to capture images of the driver's head, face and eyes. The I/O subsystem 4 includes one or more devices to provide a user interface 5 capable of receiving inputs such as commands and preferences from the driver (e.g., touchscreen, microphone with voice recognition software and hardware) and capable of outputting information such as alerts and operating instructions to the driver (e.g., speaker, display, seat vibrator). The processing subsystem 3 is responsible for all of the major processing functions described herein. The processing subsystem 3 can be implemented to include programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc. The processing subsystem 3 further includes facilities to store digital data, such as one or more memories (which may be read-write, read-only, or a combination thereof), hard drives, flash drives, or the like.

Software or firmware to implement the various functions and steps described herein may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media, e.g., read-only memory (ROM); random access memory (RAM); magnetic disk storage media; optical storage media; flash memory devices; etc.

Figure 2:
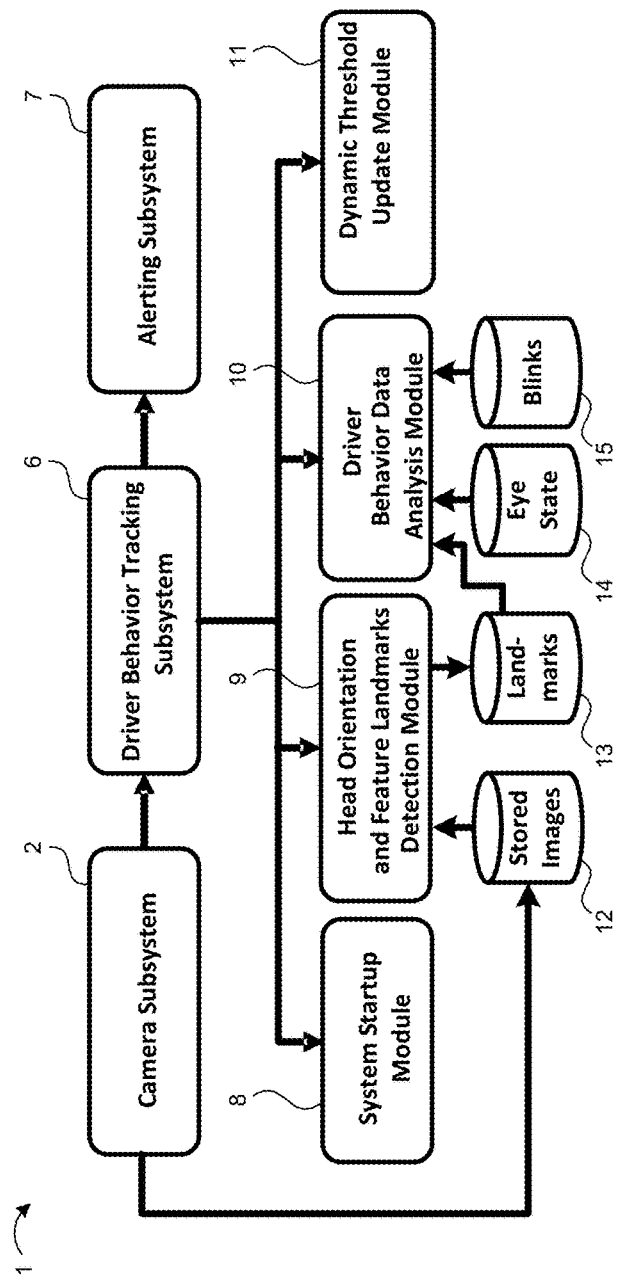
FIG. 2 is a block diagram of an example of the functional elements of the in-vehicle driver alertness monitoring system of FIG. 1.

At a functional level, in at least some embodiments, and as shown in FIG. 2, the system 1 includes three major subsystems: the image capture and store subsystem (or camera subsystem) 2, a driver behavior tracking subsystem 6 and an alerting subsystem 7, The system 1 further includes four ancillary functional modules, namely: a system startup module 8, a detect head orientation and feature landmarks module 9, an analyze driver behavior data module 10 and a dynamic threshold update module 11. Each of these subsystems and modules is described in detail below. The system further creates and maintains several datasets, including a stored images dataset 12, a landmarks dataset 13, an eye state dataset 14 and a blinks dataset 15.

Each of the elements shown in FIGS. 1 and 2 can be implemented entirely within a given vehicle (e.g., an automobile), although in some embodiments, at least portions of one or more elements (e.g., storage and/or processing resources) may be implemented remotely from the vehicle.

The system startup module 8 is responsible for initializing the system 1. As part of the initialization sequence, it requests the dynamic threshold update module 11 to perform calibration. Once the dynamic threshold update module 11 completes the calibration process, the system startup module 8 initializes the other modules.

The camera subsystem 2 continuously captures images of the driver at a rate of, for example, approximately 30 frames per second, and stores the images for further processing. The images can be stored in a local storage device (not shown), such as a memory or hard drive, or remotely in the cloud.

A. Head Orientation and Feature Landmarks Detection Module

Figure 3:
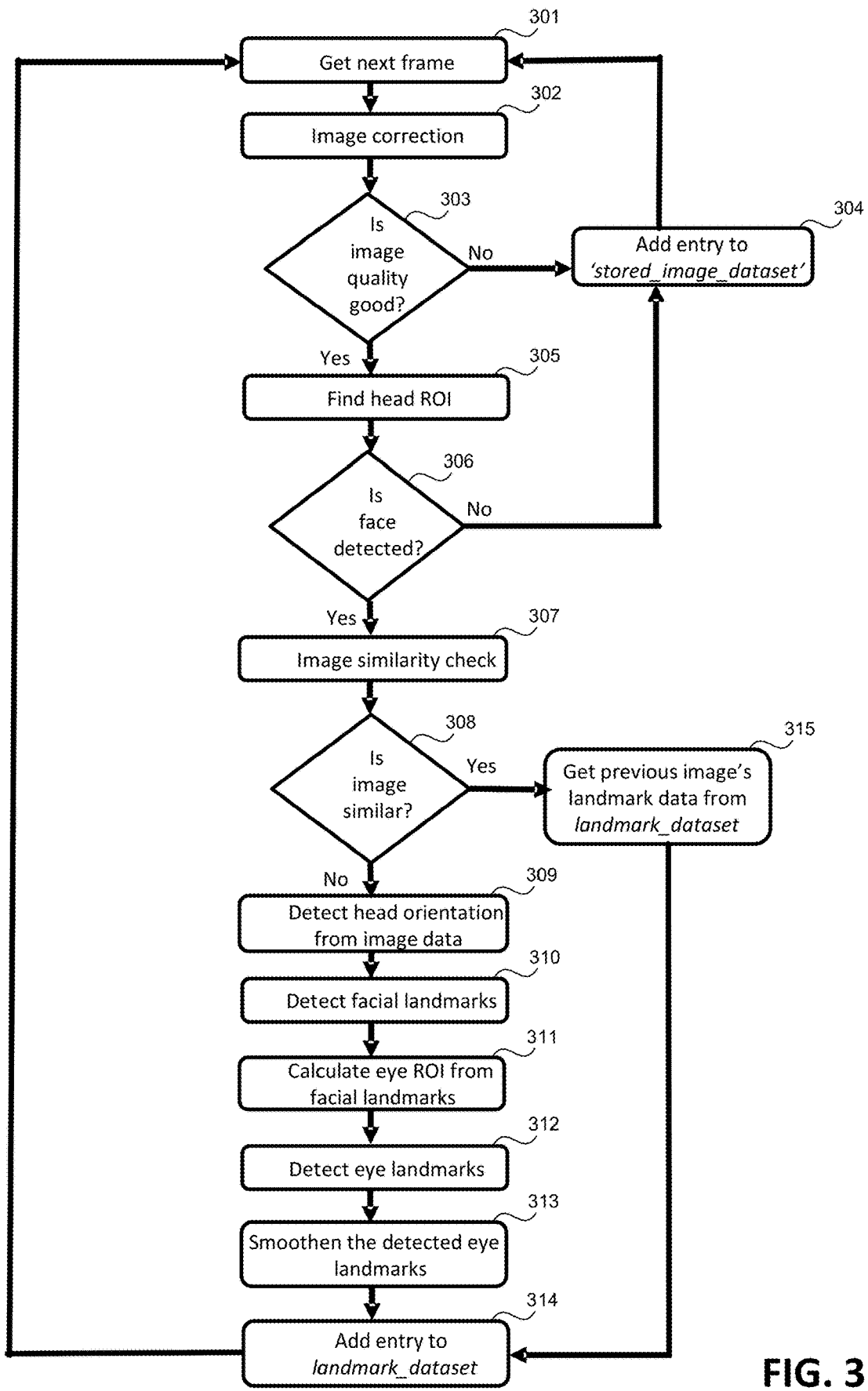
FIG. 3 is a flowchart showing an example of the overall process performed by the Head Orientation and Feature Landmarks Detection Module.

FIG. 3 shows an example of the overall process performed by the Head Orientation and Feature Landmarks Detection Module 9. After getting the next frame at step 301, the process at step 302 analyzes the captured image and applies computer vision techniques for image enhancement to minimize the impact of environmental challenges such as vibration and lighting. Some image correction techniques applied include contrast limited adaptive histogram equalization (CLAHE) and Gaussian blurring. Once the image quality is improved (step 303), the process detects the head region of interest (ROI) of the driver's head at step 305, and then detects the driver's face at step 306. If the driver's face is not detected, a record is inserted into the stored images dataset 12 at step 304, indicating frame number and a no-face-detected flag. If a face was detected, the top and bottom coordinates of the bounding box containing the face are predicted by the module.

At step 307 the process uses the previous image's eye region bounding box coordinates to extract the eye region of the current image and performs an image similarity check for both left and right eyes. If the extracted left and right eye image comparisons are within the measure of threshold for similarity (step 308), then the previous image's landmark data are used to add an entry to the landmarks dataset 13 at step 315; otherwise the process continues to step 309.

Figure 4:
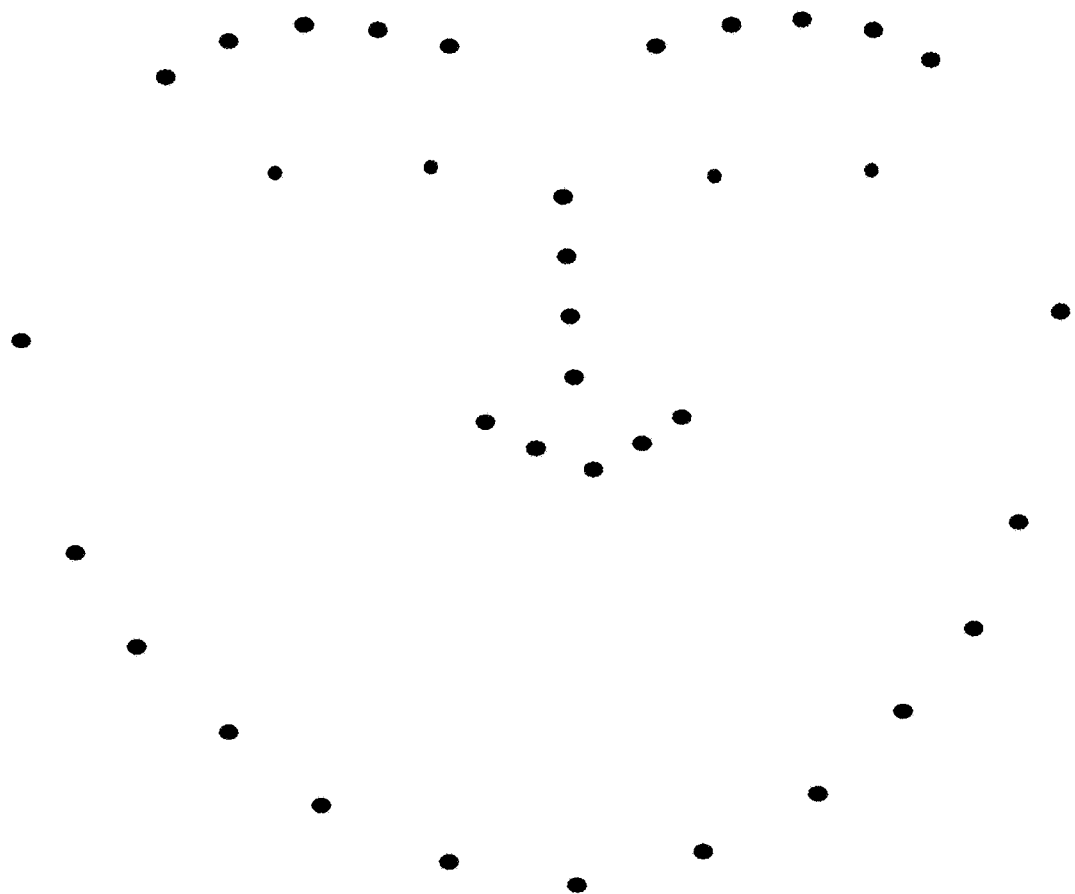
FIG. 4 shows an example of facial landmarks on the face of a person.

At step 309 the process uses deep learning techniques to detect the roll, yaw, and pitch of the driver's head from a 2D gray scale image. At step 310 the process uses deep learning techniques to detect a fixed number of landmarks on the face. FIG. 4 shows an example of facial landmarks on the face of a person such as may be detected at step 310, where each dot represents a landmark.

Figure 5:
FIG. 5 shows an example of landmarks representing the eyelid contours and center of the pupil of the eyes of a driver.

Step 311 uses the eye corner landmarks from the facial landmarks to extract the eye ROI for both the left and right eye. Step 312 uses deep learning techniques to detect a fixed number of landmarks around the eyelid contours and the center of the pupil for both left and right eyes, as shown in FIG. 5. Step 313 treats each predicted coordinate as a time-series datum and applies one or more smoothing techniques such as exponential smoothing, moving average, convolutional smoothing, Kalman smoothing, and polynomial smoothing. The full data are then written to the landmarks dataset step 314. After step 314, the process loops back to step 301.

B. Driver Behavior Data Analysis Module

Figure 6:
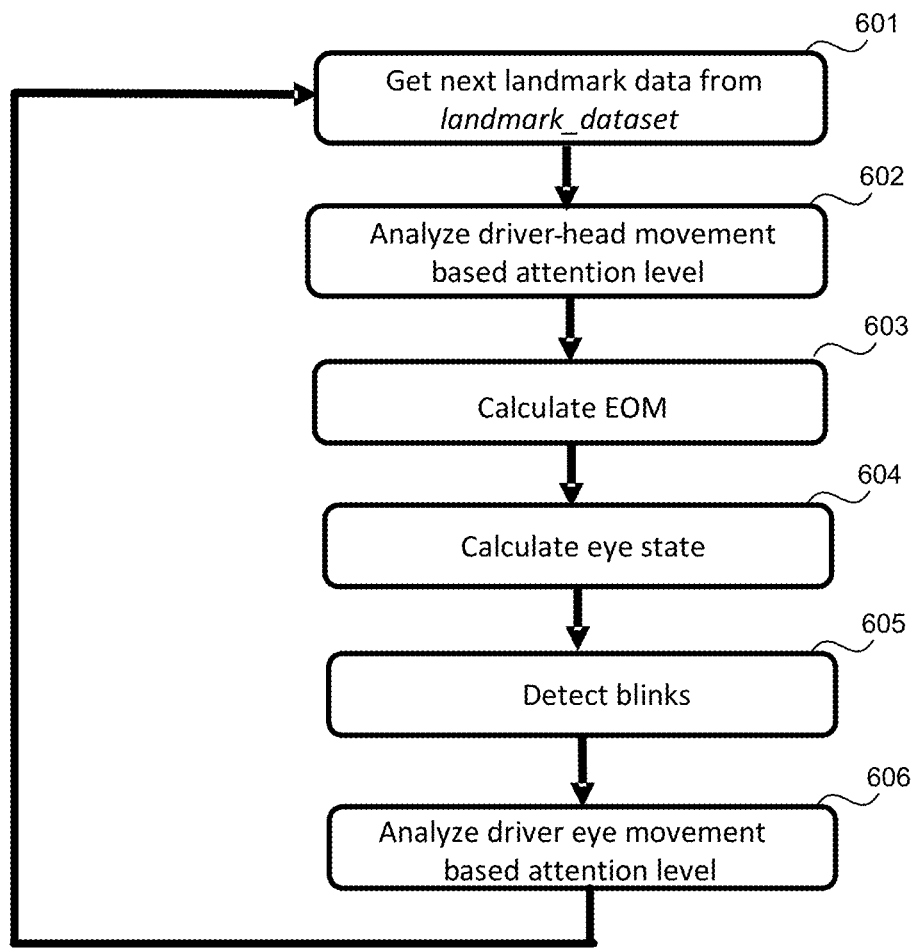
FIG. 6 is a flowchart showing an example of the process performed by the Driver Behavior Data Analysis Module.

Referring again to FIG. 2, the Driver Behavior Data Analysis Module 10 processes the data stored in the landmarks dataset to determine the driver's behavior. An example of the process performed by this module is shown in FIG. 6. Initially, the process gets the next landmark data from the landmarks dataset at step 601. The primary purpose of steps 602 and 603 is to ensure the driver is consistently maintaining a good view of the surrounding road environment necessary for safe driving by taking into consideration driver characteristics, driver behavior, and road environment. Hence, at step 602 the process analyzes the head movement of the driver. Lack of head movement over a prolonged period of time can be considered an indicator of gradual onset of decreased alertness level. Prolonged head orientation that is outside a "safe viewing cone" area can indicate distraction, such as due to devices, road activities, or interaction with vehicle occupants.

At step 603 the process analyzes the eyelid movement of each eye of the driver and calculates the eye openness measure (EOM) for each eye. In particular, step 603 calculates the robust eye openness measurement angle based on predicted eyelid landmarks. The alert records generated by this step and step 602 are among several types of alert records generated by the system. These alert records may be stored in the system for further processing and/or they may be used to directly alert the driver. Step 604 converts the measured EOM value to one of three eye states namely open, partially open, and closed, as discussed below in greater detail in connection with FIG. 10. Step 605 detects any blinks represented in the data. Step 606 determines the driver attention level based on the eye movement data. In particular, step 606 tracks the following scenarios and generates an alert record for the alert module to process:

Continuous tracking of eye closure duration.
Prolonged partial eye closure with minimal change in head orientation as an indicator of drowsiness onset due to lack of head movement and partially open eye.
Change in driver's eyelid movement pattern over a prolonged period of time. For example, decrease in blink rate, increase in eye closure time, or decrease in velocity of eye closure can indicate onset of driver fatigue or drowsiness.

After step 606, the process loops back to step 601.

C. Analysis of Driver Attention Level Based on Head Movement

Figure 11:
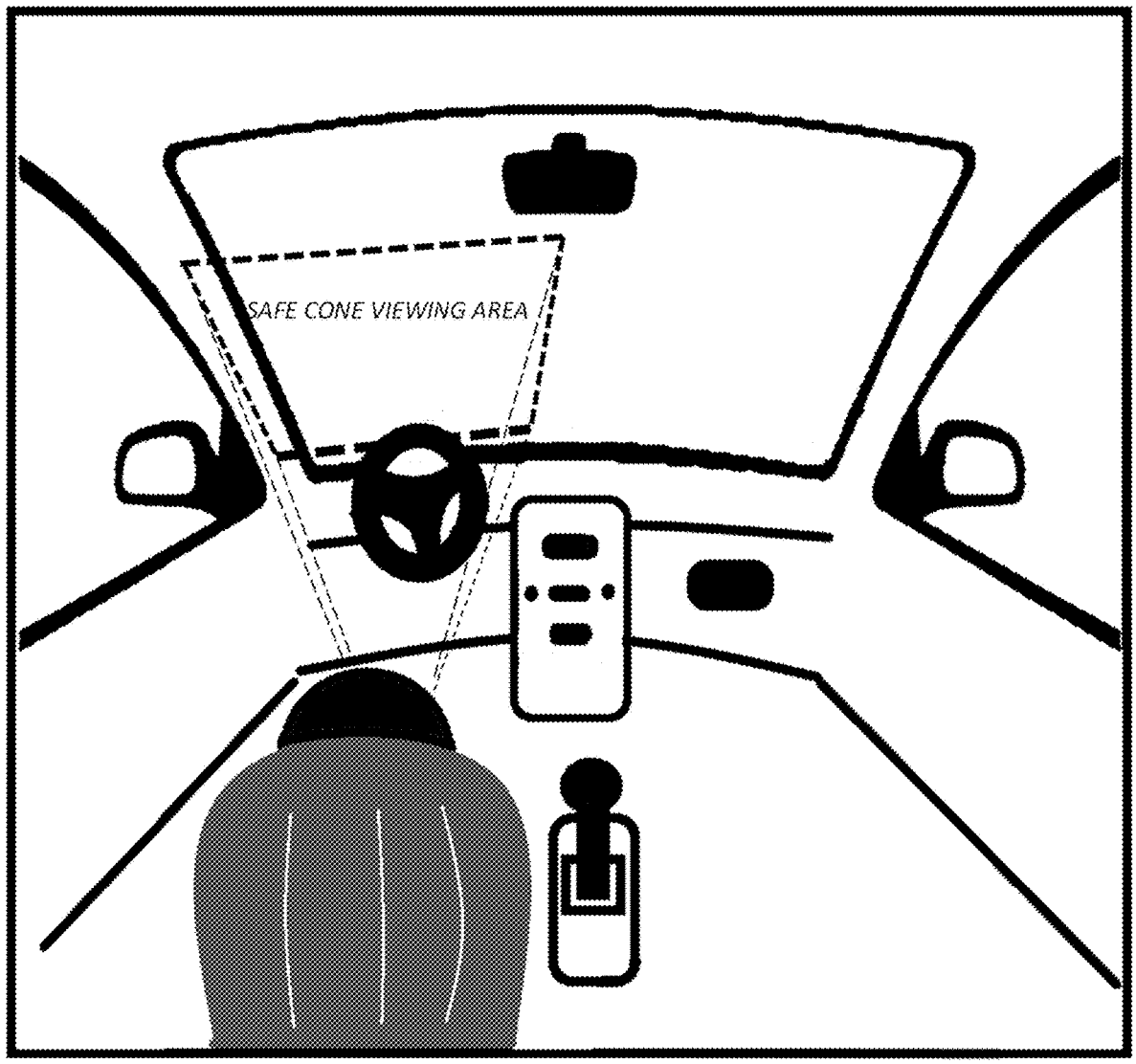
FIG. 11 illustrates an example of how a safe cone viewing area can be defined.
Figure 12:
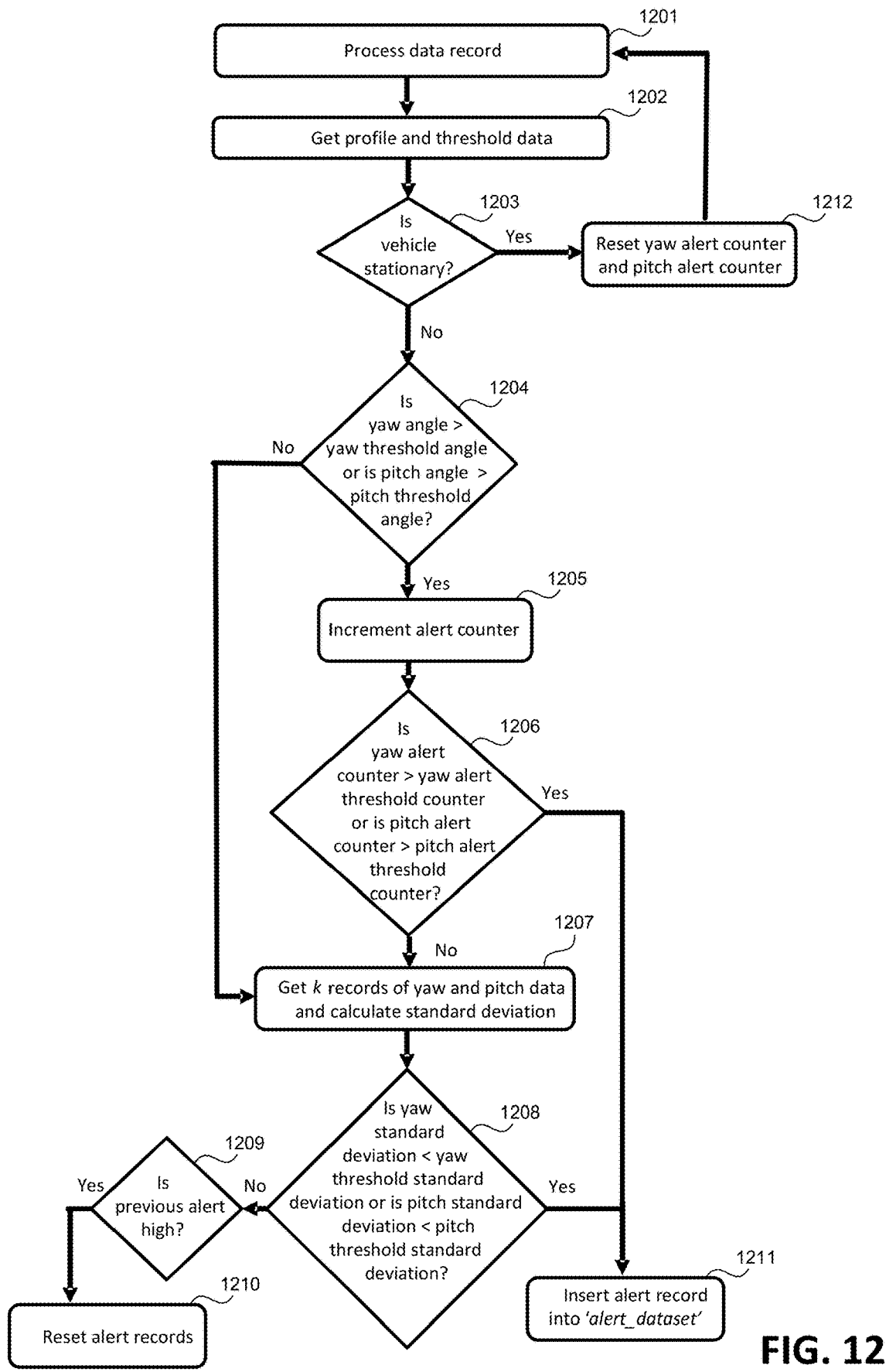
FIG. 12 is a flowchart showing an example of a process of determining the driver's attention level based on head movement.

Step 602 in FIG. 6, analyzing the driver's attention level based on head movement, will now be described in greater detail. FIG. 12 shows an example of the process of determining the driver's attention level based on head movement. At step 1201 a new data record is retrieved from the landmarks dataset. The dynamic profile and threshold criteria parameters that are used in evaluating whether to create an alert record or not are calculated at step 1202. The alert tracking parameters such as head pitch and yaw are set to initial state at step 1212 if the vehicle is stationary (step 1203), and the process then loops back to step 1201. The head orientation and feature landmarks detection module has a prioritized alert event checking mechanism. The system alerts the driver if his/her head orientation is outside the safe cone viewing area (as shown in FIG. 11).

When the vehicle is moving, prolonged head orientation that can indicate onset of decrease in driver attention is tracked. If the measured yaw or pitch angle is greater than the dynamic threshold angles at step 1204, then the corresponding alert frame counter is incremented at step 1205. At step 1206, if the yaw alert counter exceeds the dynamic yaw alert threshold counter or the pitch alert counter exceeds the dynamic pitch alert threshold counter, then an alert record is generated and the record is inserted into the alerts dataset at step 1211.

If neither threshold is exceeded at step 1206, then at step 1207 a batch of head orientation data of size k is retrieved, where parameter k is a dynamic value retrieved from the profile and threshold data module. If the standard deviation, calculated for the batch, of the yaw or pitch angles indicates very low head movement (by being less than a corresponding threshold), this implies that the driver is not routinely scanning the road environment. Therefore, if the calculated standard deviation value is less than the dynamically calculated standard deviation threshold values from the profile and threshold data module at step 1208, then an alert record is generated and inserted into alerts dataset at step 1211.

If no alert is detected, then a check is made to see if a previous head orientation-based alert was created. If no clear alert record exists for that alert record, then a clear alert record is generated and inserted into the alerts dataset at step 1210 to reset the alert records.

D. Calculation of EOM

Figure 7A:
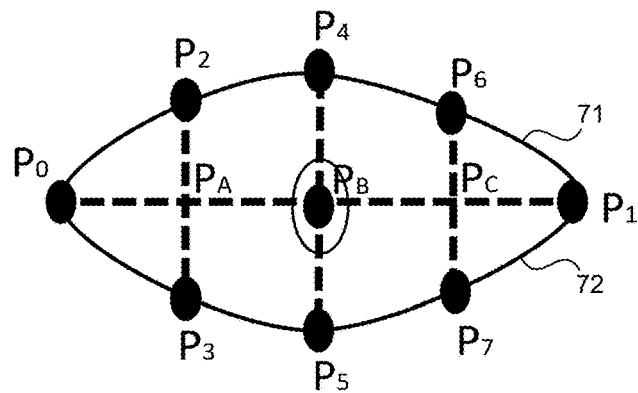
FIG. 7A schematically shows eyelid contours and landmarks of an eye in accordance with a first eye openness measure (EOM) calculation method.
Figure 7B:
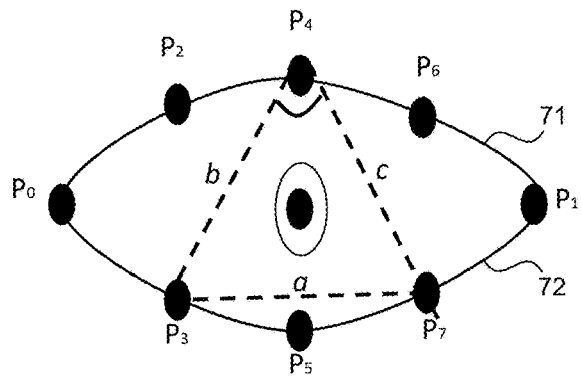
FIG. 7B schematically shows how a triangle may be defined by landmarks in the first EOM calculation method.
Figure 8:
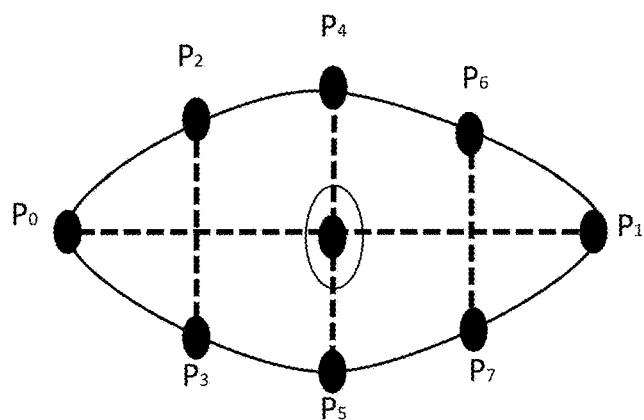
FIG. 8 schematically shows eyelid contours and landmarks of an eye in accordance with an alternate EOM calculation method.
Figure 9:
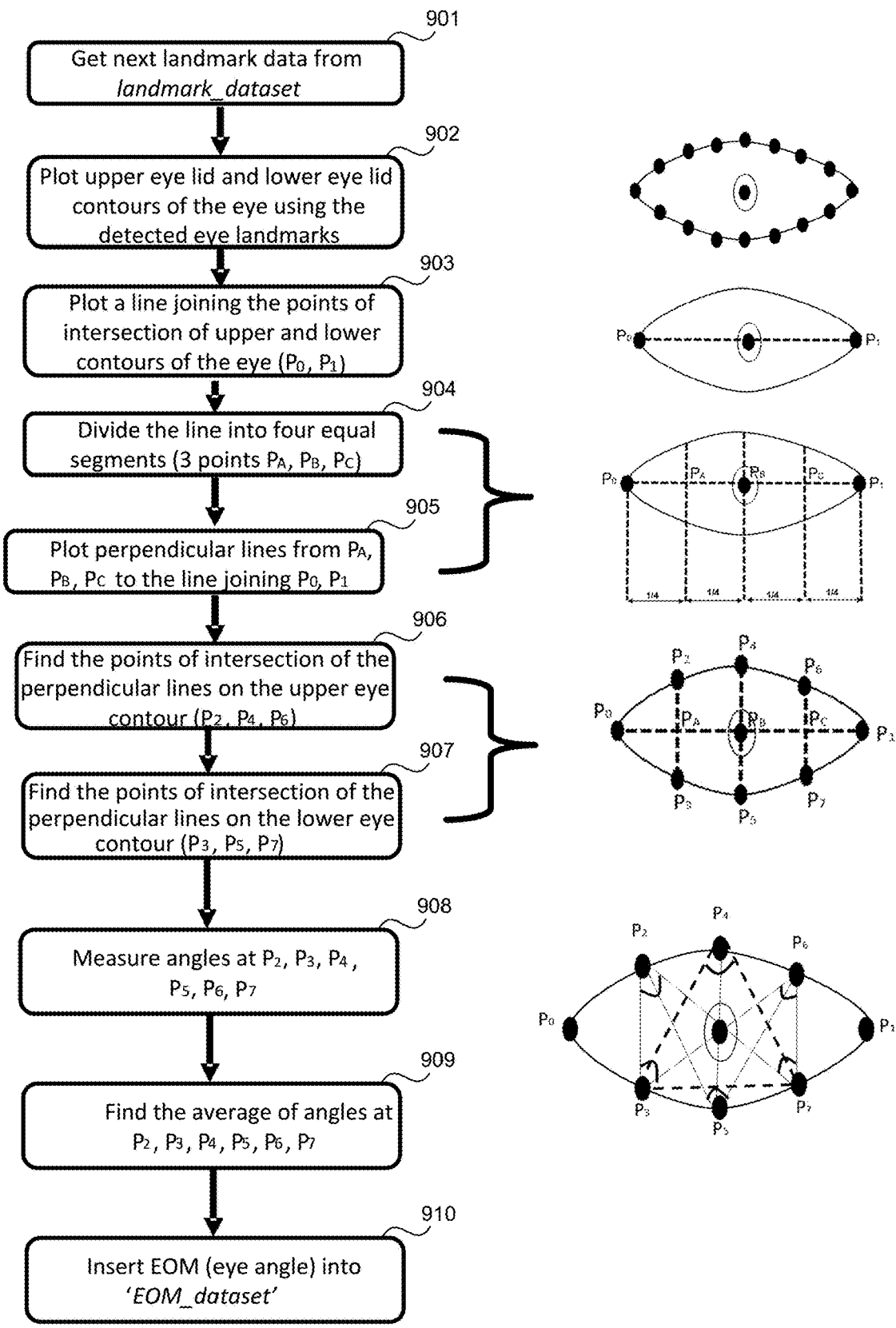
FIG. 9 is a flowchart showing an example of the process of the first EOM calculation method and corresponding to FIGS. 7A and 7B.

A method for calculating the EOM, per step 603 in FIG. 6, is now discussed in greater detail in relation to FIGS. 7A, 7B and 9. The eye landmark record from the landmarks dataset is retrieved at step 901 (FIG. 9), and the upper and lower contours of the eye are plotted programmatically at step 902. At step 903 the left and right intersection points of the upper eyelid contour 71 and lower eyelid contour 72 are identified as landmarks $P_0$ and $P_1$, respectively, as shown in FIGS. 7A, 7B and 8, and a line segment $P_0P_1$ that connects $P_0$ to $P_1$ is then plotted. The line segment $P_0P_1$ is then segmented into four equal segments at step 904, such that it produces points $P_A$, $P_B$ and $P_C$, where $$P_0P_A = P_AP_B = P_BP_C = P_CP_1$$

Line segments perpendicular to $P_0P_1$ and at $P_A$, $P_B$ and $P_C$ intersecting upper and lower eyelid contours are then plotted at step 905. The intersection points of the perpendicular lines at $P_A$, $P_B$ and $P_C$ with the upper and lower eyelid contours, designated as $P_2$, $P_4$, $P_6$, $P_3$, $P_5$ and $P_7$ in FIG. 7A, are then identified at steps 906 and 907, respectively.

The process then defines a plurality of triangles, such that the vertices of each triangle are formed by a different 3-tuple of landmarks on the upper and lower eyelid contours, and where two of those landmarks in the 3-tuple are located on a different eyelid contour (upper or lower) from the third landmark in the 3-tuple. Using the properties of a triangle, therefore, the angles at each of eyelid landmarks $P_2$, $P_4$, $P_6$, $P_3$, $P_5$ and $P_7$ (i.e., excluding the endpoints $P_0$ and $P_1$) are calculated at step 908 in accordance with equations (1) through (3) below, and the average of the angles is calculated at step 909, per equation (4) below. Consider for example the triangle formed by the eyelid landmarks $P_4$, $P_3$ and $P_7$ as shown in FIG. 7B:

$a$ distance($P_3,P_7$)

$b$ distance($P_4,P_3$)

$c$ distance($P_4,P_7$)

$$a^2 = b^2 + c^2 - 2 \cdot b \cdot c \cdot \cos \alpha(P_4) \quad (1)$$

$$\cos \alpha(P_4) = \frac{(b^2 + c^2 - a^2)}{2 \cdot b \cdot c} \quad (2)$$

$$\alpha(P_4) = \arccos\left(\frac{(b^2 + c^2 - a^2)}{2 \cdot b \cdot c}\right) \quad (3)$$

$$EOM = \frac{\left(\sum_{k=1}^{n} \alpha\right)}{n} \quad (4)$$

Where $\alpha(P_4)$, is the angle at landmark $P_4$,

EOM, is the Eye Openness Measurement, n, is the number of angles calculated, and $\alpha$, is the angle at each eyelid landmark with respect to other eyelid landmarks.

An alternate method used for measuring eye openness level is illustrated schematically in FIG. 8. This alternate method involves measuring the height of the eyelid at selected points and averaging the eye height by the number of such measurements multiplied by the width of the eye in accordance with equation (5).

$$EHWR = \frac{\|P_2 - P_3\| + \|P_4 - P_5\| + \|P_6 - P_7\|}{3\|P_1 - P_0\|} \quad (5)$$

In a real-time environment, the eyelid landmarks detected by the system can vary from frame to frame. These variations have a negative impact on the accuracy of eyelid movement tracking. The accuracy of the detection of landmarks at the edge of the eyes is more prone to variation than the landmarks on the eyelid. These variations on successive images can have significant negative impact on the accuracy of the eyelid tracking. Therefore, the EOM calculation method of FIGS. 7A, 7B and 9 attempts to reduce the impact of eye edge landmarks by avoiding them when measuring angles among the eyelid landmarks. The alternate method of FIG. 8 is more susceptible to variation in the eye edge landmarks because the ratio is formed by dividing the height of the eyelid by the width of the eyelid (i.e., the distance between the edges of the eye).

Since the width of the eye is almost twice the height of the eye, the ratio produced by this alternate EOM method is often less than 0.5 when the eye is fully open and tends towards zero as the eyelid closes. As a result, the inaccuracies in landmark detection on eye angle ratio (EAR) tend to have significantly more negative impact as the eyelid closes. The EOM calculation method of FIGS. 7A, 7B and 9 on the other hand tends to have larger range of angles from 30° to 180° for fully open eyelid to closed eyelid. The angle between the landmarks on the eyelid increases as the eyelid closes. This behavior of the EOM calculation method of FIGS. 7A, 7B and 9 reduces the impact of inaccuracies in eyelid landmark detection in comparison to at least the method of FIG. 8.

E. Calculation of Eye State

Figure 10:
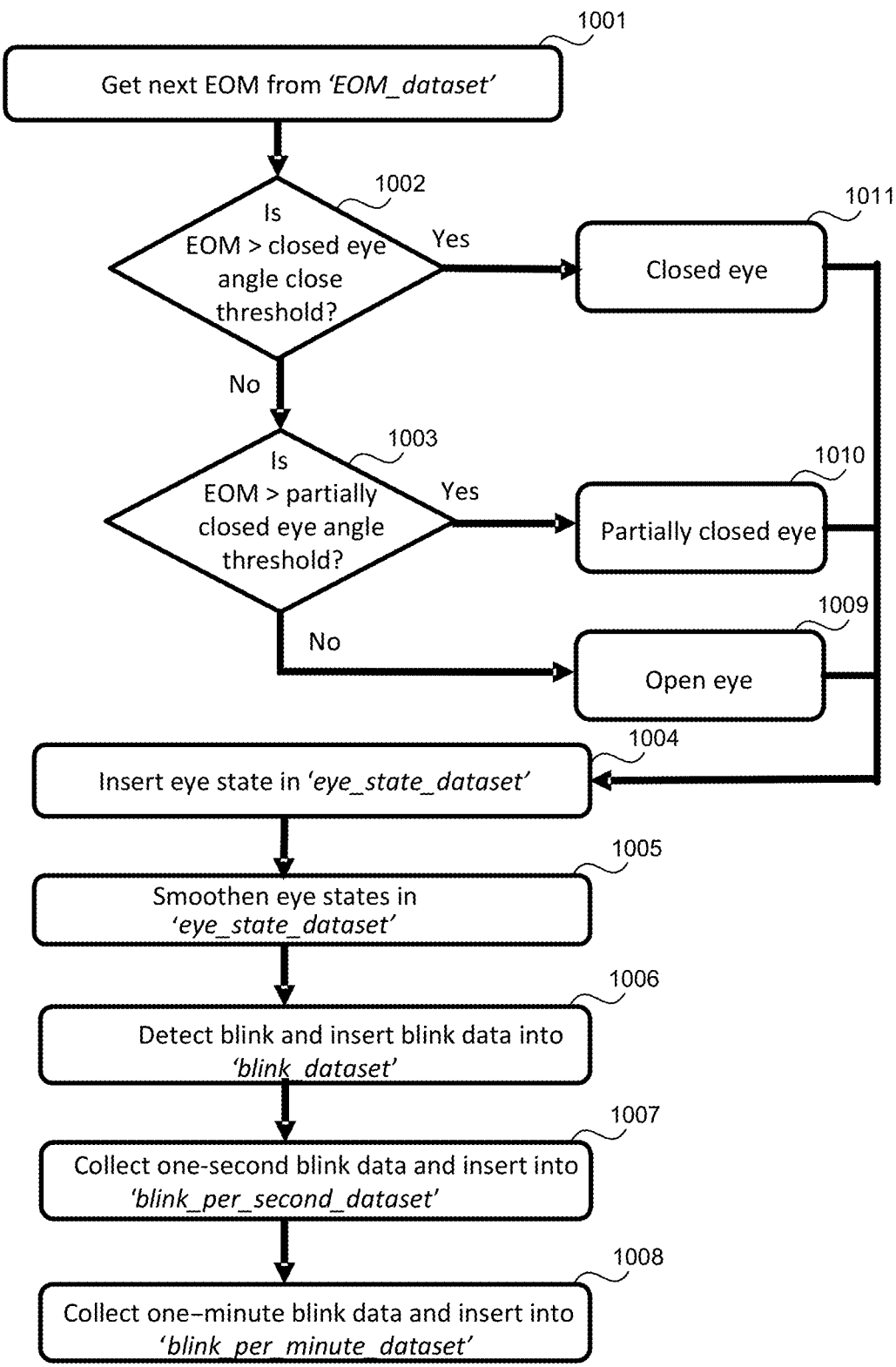
FIG. 10 is a flowchart showing an example of the overall process of eye state detection.

Step 604 in FIG. 6, eye state calculation, will now be described in greater detail. FIG. 10 illustrates an example of the overall process that may be performed in step 604. The process begins by retrieving the next EOM value from the EOM dataset (step 1001), and based on pre-configured thresholds (step 1002 and step 1003) representing percentage of eye closure, categorizing the EOM value into open eye (step 1009), partially closed eye (step 1010) or closed eye state (step 1011), which is then inserted into the eye state dataset 14 at step 1004. Partially closed eye state (step 1010) is used to determine the driver alertness level when the driver is looking down such that the eye is not fully closed, but the percentage of open eye is not sufficient for safe driving. That is, with a partially closed eye, the driver does not meet the criteria for "safe cone viewing area". The "safe cone viewing area" is the area of the windshield between the driver door and the rear-view mirror, as shown in FIG. 11. Once the eye state is determined, the time series eye state data set is smoothed at step 1005 using, for example, any of the smoothing methods described above.

Next, the process checks for eye blinks at step 1006. If a blink is detected, blink related parameters such as blink duration, eye closure duration, eyelid closure speed, and/or eyelid open speed are calculated, and a blink record is created and stored in the blinks dataset 15. The blinks dataset 15 includes two subsets, called the blinks-per-second dataset and the blinks-per-minute dataset (not shown). If the eye closure duration exceeds the microsleep duration threshold, a flag is set to indicate a microsleep event in the blink record.

Next the process checks whether one second of blink data has been collected at step 1007. If so, a set of per-second parameters are calculated, a per-second record is created, and the record is stored in a blinks-per-second dataset at step 1007. The parameters can include, for example, blink rate per second, average blink duration, average eye closure, average speed of eyelid closure, average speed of eyelid opening, and/or count of eye closures that exceed the microsleep duration threshold. Similarly, a similar set of parameters are calculated for each minute of record and stored in a blinks-per-minute dataset at step 1008.

Figure 13:
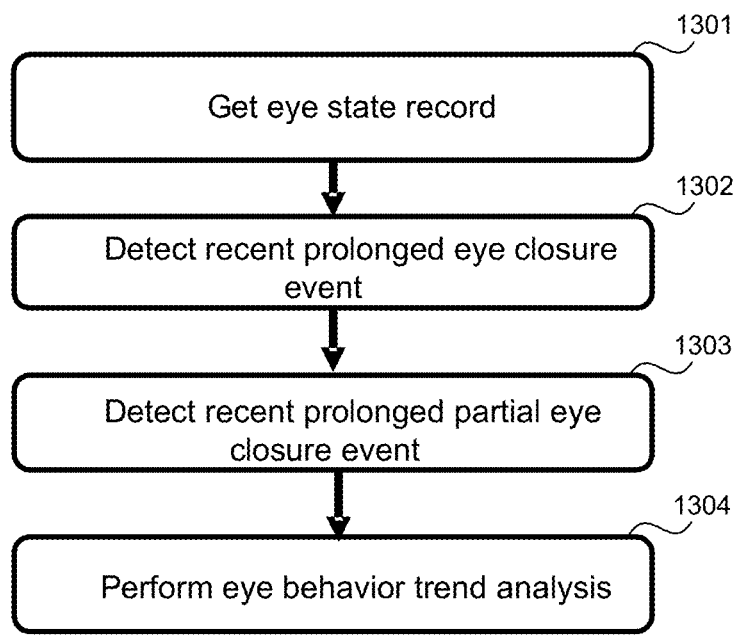
FIG. 13 is a flowchart showing an example of the process of determining the driver's attention level based on eye movement (extent of eye closure).

F. Analysis of Driver Attention Level Based on Eye Movement:

FIG. 13 shows in greater detail, an example of step 606 (FIG. 6), determining the driver's attention level based on eye movement. This process is responsible for detecting unsafe driving based on a collection of analyses applied on eye movement datasets. As in the process of FIG. 12, when an unsafe event is detected, an alert record representing the type of unsafe event is created and inserted into the alerts dataset. Similarly, when the unsafe event clears, a corresponding clear alert record is also inserted to the alerts dataset.

Step 1301 gets the eye state record, calculated in step 606 of FIG. 6. Step 1302 continuously analyzes the eye state data to detect any eye closure duration that is higher than the dynamic eye closed state threshold value. Step 1303 detects continuous partially closed eye state in conjunction with head orientation. It is possible to have partially closed eye states due to reclined seat and head orientation. These scenarios should not create an alarm state. Therefore, step 1303 takes into consideration the head orientation, duration, and eye state for analysis. Step 1304 detects changes in eye closure behavior over time that indicate onset of decrease in driver attention level. This step analyzes parameters such as blink rate, speed of eyelid movement, and duration of eye closure.

G. Detection of Recent Prolonged Full Eye Closure Event

Figure 14:
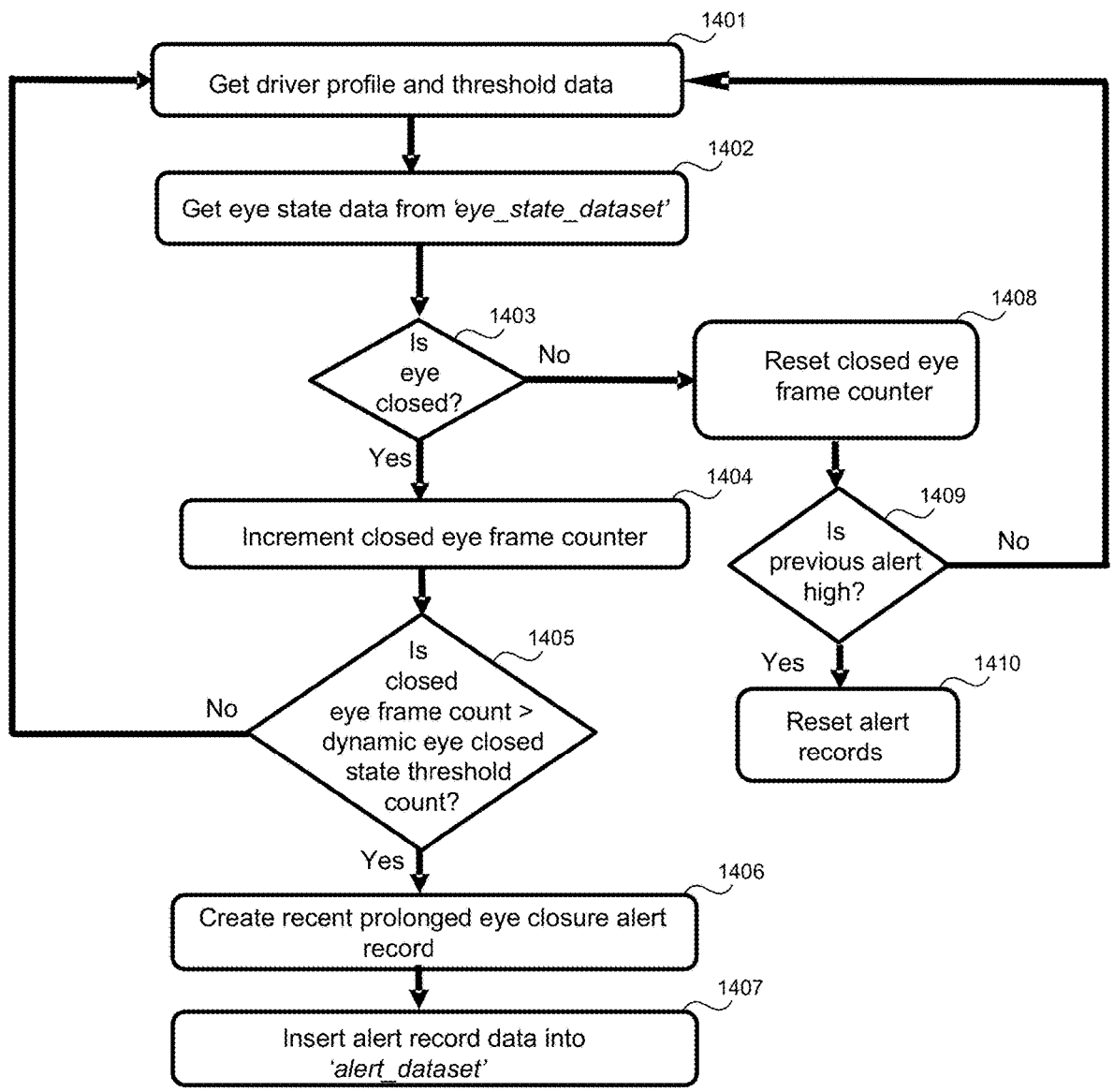
FIG. 14 is a flowchart showing an example of the process of detecting a recent prolonged full eye closure event.

FIG. 14 shows in greater detail, an example of the process included in step 1303, detecting a recent prolonged full eye closure event. This process at step 1401 initially retrieves driver profile and threshold data (e.g., dynamic threshold parameters k, m and n, discussed below) from the dynamic threshold update module 11 (FIG. 2). At steps 1402 and 1403, the most recent batch of eye states is analyzed and the number of continuous frames for which the eye state is closed is counted. For each frame where the eye state is closed, the closed eye frame count is incremented (step 1404). The closed eye frame count is compared at step 1405 against the dynamic eye state closed count threshold (retrieved from profile and threshold data at step 1401), and if the closed eye frame count is greater, a recent prolonged eye closure alert record is created at step 1406 and inserted into the alerts dataset at step 1407; otherwise, the process loops back to step 1401. If during the process of looking for continuous eye closed state at step 1403, a partial closed or open eye state is encountered, the closed eye frame count is reset at step 1408 and checked for a previous recent prolonged eye closure alert record without a clear alert record at step 1409. If it exists, a clear recent prolonged eye closure alert record is created and inserted into the alerts dataset at step 1410; otherwise, the process loops back to step 1401.

H. Detection of Recent Prolonged Partial Eye Closure Event

Figure 15:
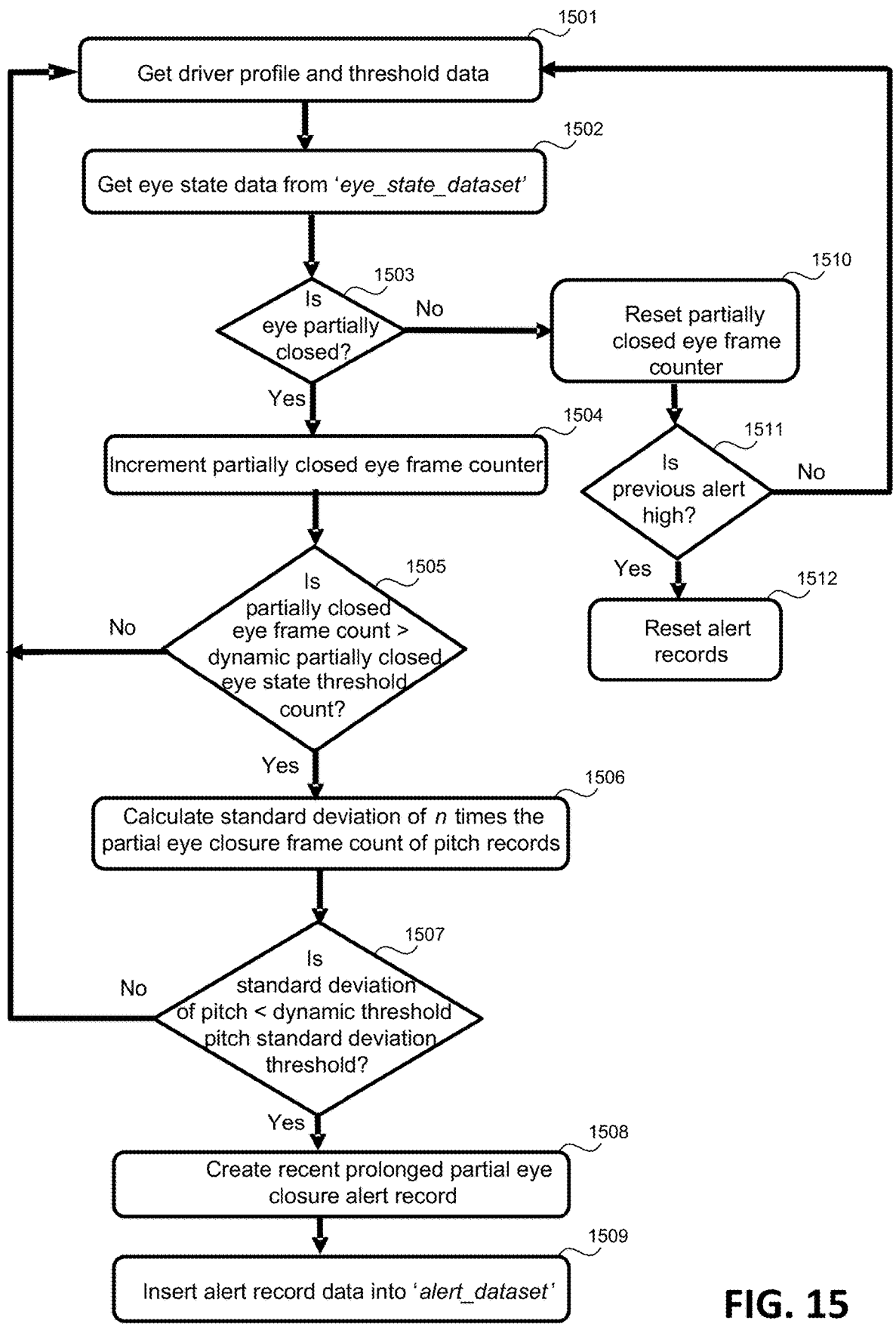
FIG. 15 is a flowchart showing an example of the process of detecting a recent prolonged partial eye closure event.

FIG. 15 shows in greater detail, an example of the process included in step 1303, detecting a recent prolonged partial eye closure event. This step counts the number of continuous partially closed eye state frames. Continuous partial eye closure state may also happen due to a reclined driver seat. When the seat is reclined, a driver tends to adjust their head such that the head remains within the safe driving cone. Such an orientation, by itself, is not a concern for safety as long as the driver maintains safe driving behavior. Therefore, it is important to take into consideration not only the duration of partial eye closure state but also the head orientation and corresponding duration of the head orientation.

This process (FIG. 15) at step 1501 initially retrieves driver profile and threshold data for partial eye closed state (e.g., dynamic threshold parameters k, m and n, discussed below) from the dynamic threshold update module 11 (FIG. 2). The most recent batch of eye states is analyzed and the number of continuous frames for which the eye state is partially closed is counted at steps 1502 and 1503. For each frame where the eye state is partially closed, the partially closed eye frame count is incremented (step 1504). If at step 1505 the partially closed eye frame count is greater than the dynamic eye state partially closed count threshold retrieved from profile and threshold data at step 1501, then at step 1506 the process calculates the standard deviation of head pitch over n multiples of partial eye closure frame count, where parameter n is determined by the profile and threshold module. Otherwise, the process loops back to step 1501. After step 1506, if the standard deviation is less than the corresponding threshold for head pitch standard deviation (indicating very little or narrow head movement) at step 1507, then an alert record indicating prolonged partial eye closure event is created at step 1508 and is inserted into alerts dataset at step 1509. Otherwise, the process loops back to step 1501. If a partial eye state is not detected at step 1503, then the partially closed eye frame count is reset at step 1510, and if a previous alert exists with a clear alert message (step 1511), then a clear alert message for prolonged partial eye closure event is created and inserted into the alerts dataset at step 1512.

I. Eye Behavior Trend Analysis

Figure 16:
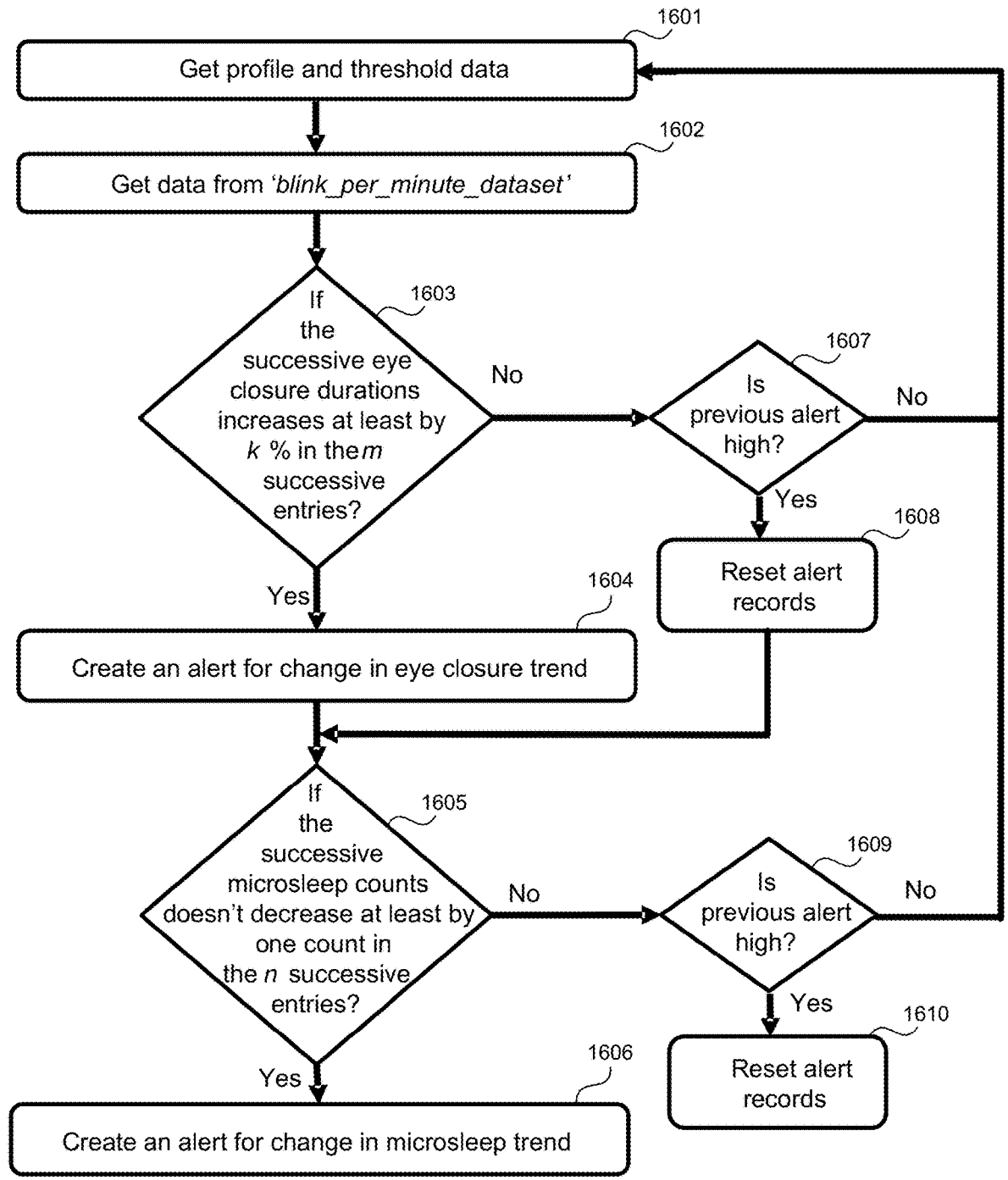
FIG. 16 is a flowchart showing an example of the process of performing eye behavior trend analysis.

FIG. 16 shows in greater detail, an example of the process included in step 1304 (FIG. 13), eye behavior trend analysis. This analysis involves projecting future behavior based on historical behavioral data. The module analyzes the trend in the eye closure duration stored in blinks-per-minute dataset. The process initially retrieves driver profile and threshold data (e.g., dynamic threshold parameters k, m and n, discussed below) from the dynamic threshold update module 11 (FIG. 2) at step 1601, and retrieves data from the blinks-per-minute dataset at step 1602. If the eye closure duration shows a trend of k % increase for a sample of m minutes at step 1603, that is deemed indicative of the onset of drowsiness. In that event, an alert of type 'change in eye closure trend' is created and the record is inserted into alerts dataset at step 1604. The parameter k is a specified threshold percentage value, and parameter m is a specified number of minutes. Similarly, if the microsleep count does not decrease by at least one count in a sample of n minutes at step 1605, that is deemed indicative of an ongoing drowsiness state. In that event, therefore, an alert of type 'change in microsleep trend' is created and the record is inserted into alerts dataset at step 1606. If no alert condition is detected at step 1603 or step 1605, then a check is made for a previous alert of type 'change in eye closure trend' or 'change in microsleep trend' at step 1607 or 1609, respectively. Otherwise the process loops back to step 1601. If a previous alert exists without a corresponding clear alert request, then a record is created to clear the 'change in eye closure trend' and is inserted into alerts dataset. After step 314, the process loops back to step 301.

J. Dynamic Threshold Update Module

The dynamic threshold update module 11 (FIG. 2) is responsible for providing the thresholds used for eye state and head movement comparison to determine driver alertness level. The thresholds can be broadly classified into time-based threshold values and angle-based threshold values. Time-based threshold values are used in deciding how long the driver can remain inattentive safely before such inattentiveness represents a decrease in alertness. Time-based threshold values are also of two types. One type deals with immediate events and the other deals with trends over a longer period of time. Angle-based threshold values can be broadly categorized into two types, one based on head orientation (roll, yaw, and pitch) and the other based on eye movement (eyelid openness measure).

The time-based threshold values deal with reaction or response time required for a safe level of driver attention.

The required reaction time can vary depending on the influence of various environmental parameters. As the driving environment changes, the comparison thresholds are updated proportionately to keep up with the changing environment. Parameters that may influence the driver's reaction or response time to an event while driving can be broadly categorized into the following types:

Driver parameters, for example: age, physical limitations, EOM, blink rate, eye closure time, head orientation angles Vehicle parameters, for example: length, weight, speed, route maps Road parameters, for example: traffic congestion, road type (straight, curvy)

Weather parameters, for example: time of day, season

These parameters tend to have significant impact on a driver's reaction time to a driving event. Therefore, the dynamic threshold update module can take into consideration some or all of these parameters in calculating the threshold parameters. For example, consider the following scenario: A 35-year-old male is driving a sedan at 100 km/hour on a summer Sunday morning on a highway with low traffic. Typical response time for a young adult is around 200 ms. At 100 km/hour the sedan travels 27 meters per second. A typical sedan length is 4.5 meters. Therefore in 200 ms, the vehicle would have travelled 5.4 meters which is more than the length of a sedan car. Therefore, it is important to take into consideration the above-mentioned input parameters when deciding how long a driver can remain inattentive before it becomes unsafe. The reaction time also increases due to the influence of parameters such as age, drowsiness/fatigue, and distraction.

The dynamic threshold update module input data sources include:

Vehicle parameters: Vehicle status information including but not limited to speed, turn signal, and distance to objects in front of the vehicle, and camera frame rate.

Driver parameters: Driver parameters stored locally on a device, driver mobile phone, and/or cloud services.

Road parameters: Road parameters can be obtained from navigation systems, route maps, road infrastructure, cloud services, and/or driver mobile phone.

Weather parameters: Weather parameters can be obtained from road infrastructure, driver mobile phone, and/or cloud services.

Each input parameter has a preconfigured safe response time. For example, Tables 1, 2 and 3 describe examples of the input parameters and corresponding safe response times and weights.

TABLE 1

Speed

| Speed (km/h) | Low (0 to 30) | Medium (31 to 50) | High (51 to 100) | Influence fractional weight |
|---|---|---|---|---|
| Response (ms) | $S_1$ | $S_2$ | $S_3$ | $\omega_S$ |

TABLE 2

Driver Age

| Age (years) | 20 to 40 | 41 to 50 | 51 to 100 | Influence fractional weight |
|---|---|---|---|---|
| Response (ms) | $A_1$ | $A_2$ | $A_3$ | $\omega_A$ |

TABLE 3

Traffic Congestion

| Traffic Congestion | Low | Medium | High | Influence fractional weight |
|---|---|---|---|---|
| Response (ms) | $T_1$ | $T_2$ | $T_3$ | $\omega_T$ |

Each reaction time threshold parameter can be a weighted sum of these input parameters. The general equation for a time-based threshold parameter is:

$$TRT = \frac{\left(\sum_{k=1}^{n} \omega_k * \text{response\_time}_k\right)}{n}$$

where

TRT is threshold response time $\omega_k$ is weight contribution of the parameter response_time$_k$ is the independent response_time of the parameter n is the number of input parameters Angle threshold values for head orientation can be based on generic data supplied with the system or calibrated roll, yaw, and pitch values for the driver. These values can be measured from calibration. They represent a head orientation suitable for the safe cone viewing area. The eye openness level measure-based thresholds can also be obtained either from custom driver calibration or from generic data supplied with the system.

Figure 17:
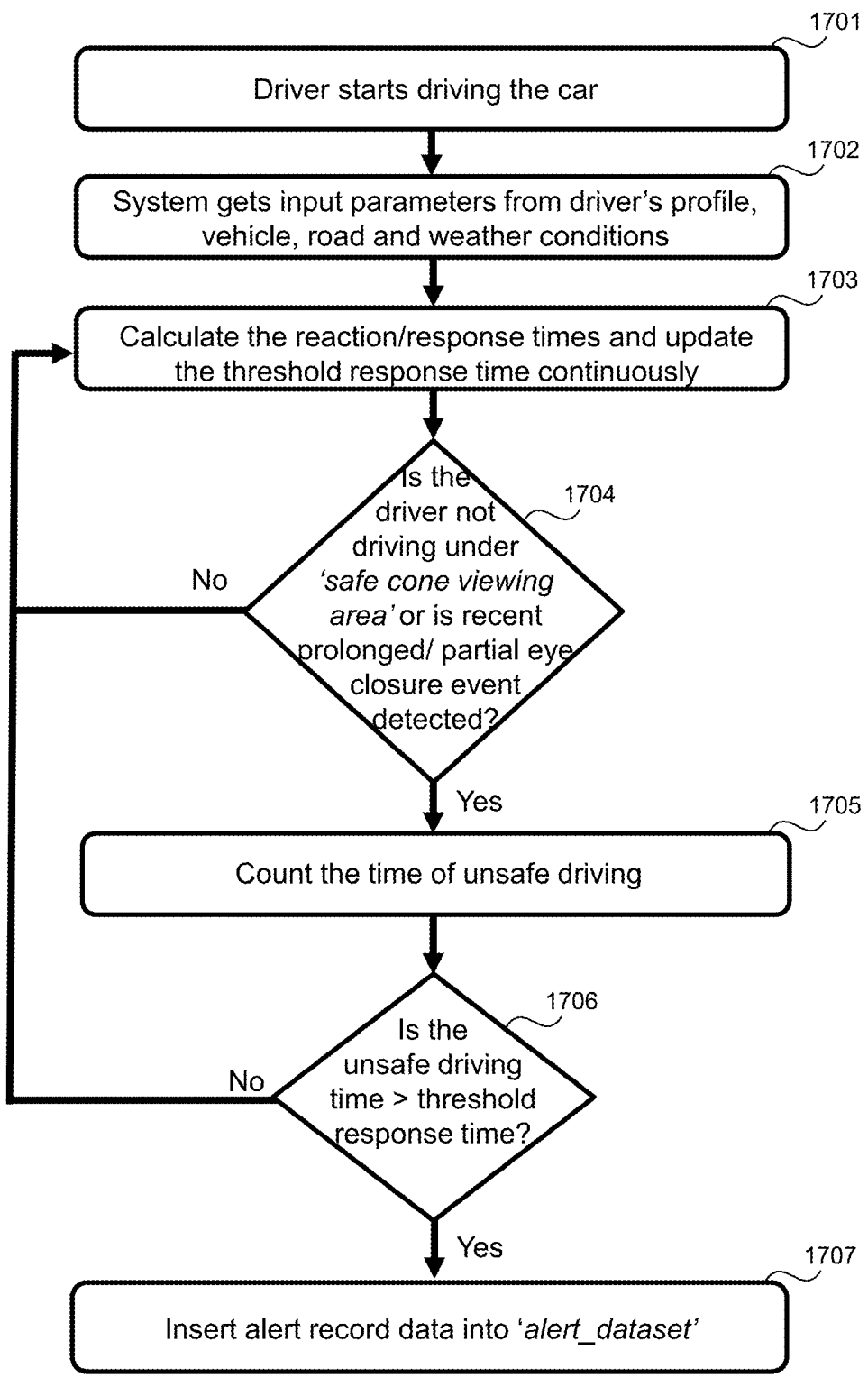
FIG. 17 is a flowchart showing an example of the process of calculating and monitoring driver response/reaction times.

An example of a process for calculating and monitoring the driver's response/reaction times is shown in FIG. 17. After the driver begins driving the car (step 1701), the system at step 1702 gets input parameters from the driver's profile as well as vehicle, road and weather conditions. The system then calculates response/reaction times and updates the thresholds continuously at step 1703. At step 1704 the system determines whether or not the driver is driving within the "safe cone viewing area" and whether a recent prolonged partial eye closure event has been detected. If either condition is detected, the system proceeds to step 1705, in which the system updates the count of unsafe driving time. If neither condition is detected, the process loops back to step 1703. If the unsafe driving time exceeds a corresponding threshold at step 1706, then the system creates an alert record and inserts it into the alerts dataset at step 1707.

K. Driver Parameter Calibration

Figure 18:
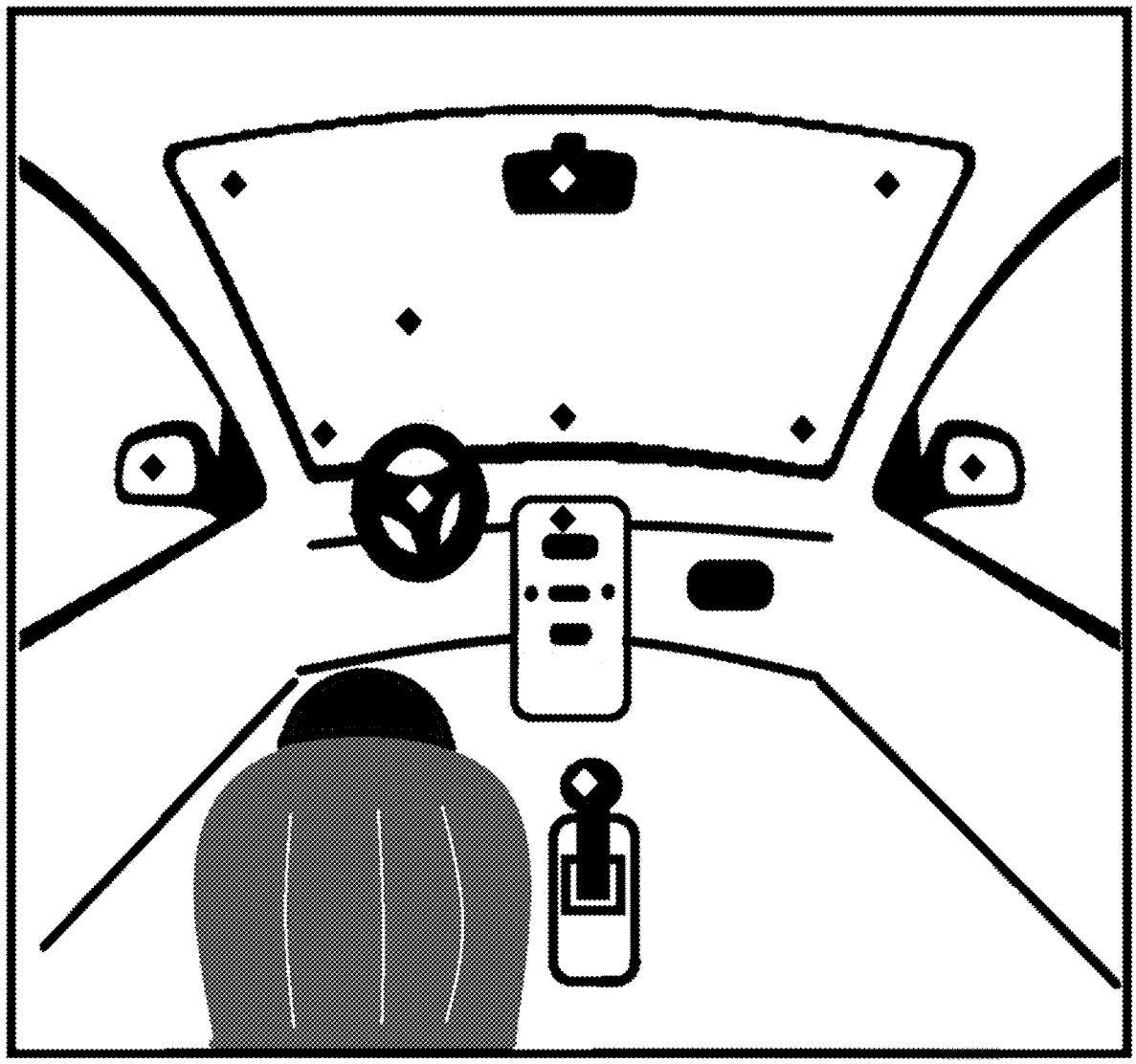
FIG. 18 shows an example of a spatial configuration for driver's parameter calibration inside a vehicle.
Figure 19:
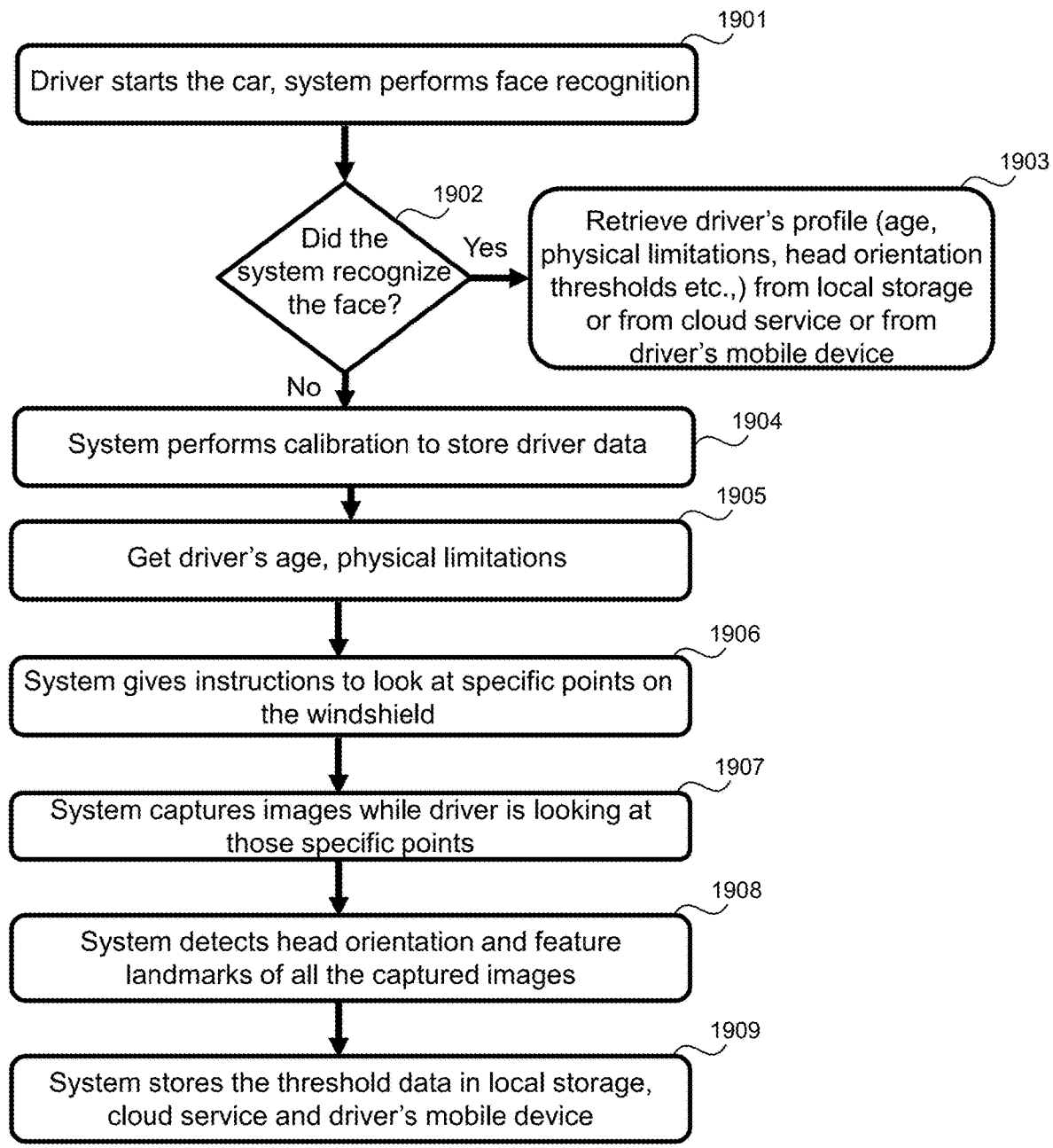
FIG. 19 is a flowchart showing an example of the process of performing driver's parameter calibration.

The Dynamic Threshold Update Module 11 is also responsible for obtaining the driver parameters, such as age, physical limitations, head orientation angles, and eye openness level measures through calibration. An example of a spatial configuration for driver's parameter calibration inside a vehicle is shown in FIG. 18, and an example of the process of driver's parameter calibration is shown in FIG. 19.

To perform calibration (e.g., when the car is first started), the process initially performs a facial recognition to identify the driver at step 1901. If the driver is identified (step 1902), then the driver profile data are retrieved from local storage at step 1903. A check is performed for a newer version of the driver profile by requesting an update from the driver's mobile device and/or a cloud service. If an update is available then it is stored locally.

If the driver is not identified, then at step 1904 the process performs a calibration to create a profile for the driver. At step 1905 the process gets the driver's age and physical limitations (if any). The process then at step 1906 provides audio and visual instructions to the driver to look at specific locations inside the vehicle, examples of which are indicated by the diamond shapes in FIG. 18. At each location, the module at step 1907 captures a batch of images for a period of, for example, five seconds. The captured images are then used to determine head orientation angles and eye openness level measures using facial and eye landmarks at step 1908. The measured values are then stored at step 1909 in local storage system, cloud service, and/or the driver's mobile device for future access.

L. Alerting Subsystem

Figure 20:
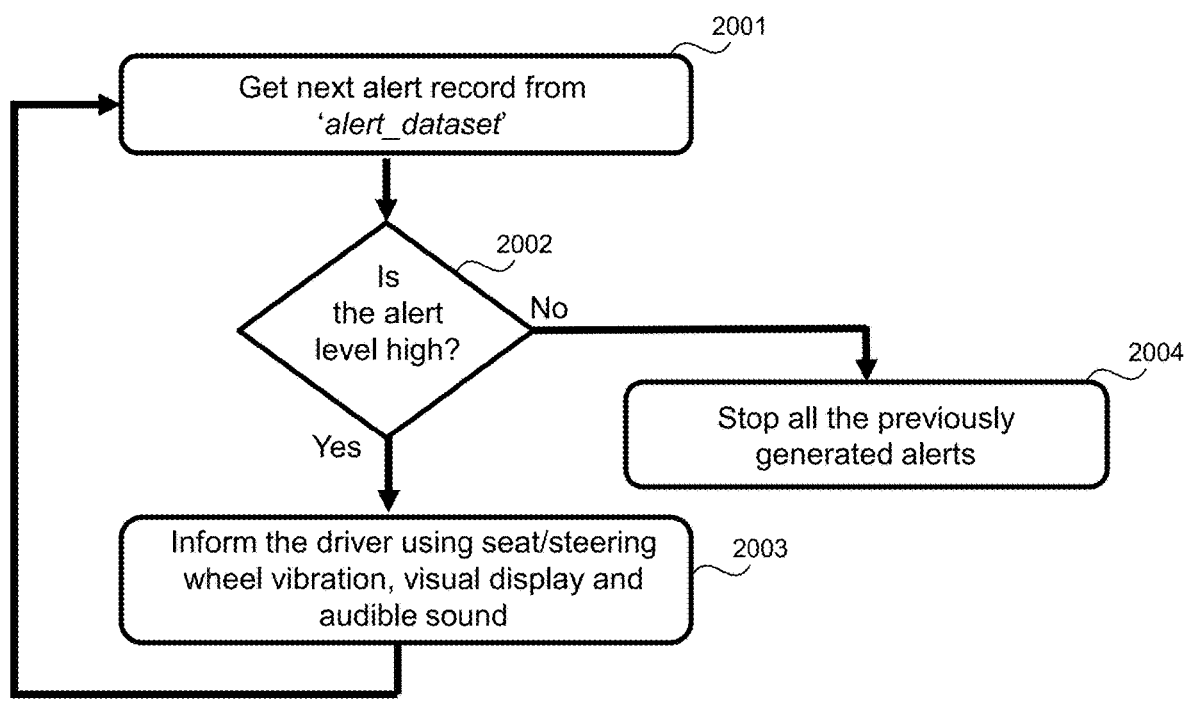
FIG. 20 is a flowchart showing an example of the process performed by the Alerting Subsystem.

The Alerting Subsystem 7 (FIG. 2) generates the alerts. An example of the overall process performed by this subsystem is shown in FIG. 20. All alerts recorded in the alerts dataset are processed (step 2001) by the Alerting Subsystem 7. The process in FIG. 20 checks whether the alert level recorded in the dataset is high at step 2002. If the alert level is high, the process informs the driver at step 2003 by any one or more methods, such as seat/steering wheel vibration, visual display, and/or audible alert. If the alert level is not high, the process stops all previously generated alerts at step 2004. After step 2003, the process loops back to step 2001.

III. Examples of Certain Embodiments

Certain embodiments of the technology introduced herein are summarized in the following numbered examples:

1. A method comprising:
   obtaining image data representing images of an eye of a driver, the images having been captured while the driver is operating a vehicle;
   computing an eye openness measure of the eye of the driver, based on the image data;
   determining that the driver is in an unsafe state for driving based on the eye openness measure; and
   generating an alert, while the driver is operating the vehicle, based on determining that the driver is in the unsafe state.
2. A method as recited in example 1, wherein computing an eye openness measure of the eye of the driver comprises determining an eye state for the eye, and wherein the eye state is from the set of eye states consisting of: a fully open state, a partially open state, and a closed state.
3. A method as recited in example 1 or example 2, further comprising:
   determining a parameter set based on the eye state, the parameter set including at least one of a blink count, blink rate, eye closure duration, eye open duration, speed of eyelid closure, or speed of eyelid opening; and
   applying at least one parameter of the parameter set to a threshold or profile to identify an amount of deviation.
4. A method as recited in any of examples 1 through 3, further comprising:
   determining a plurality of thresholds;
   wherein said determining that the driver is in an unsafe state for driving comprises applying acquired or computed data to the plurality of thresholds, and wherein the plurality of thresholds includes a plurality of time-based thresholds and a plurality of angle-based thresholds.
5. A method as recited in any of examples 1 through 4, wherein at least one of the time-based thresholds relates to driver reaction time.
6. A method as recited in any of examples 1 through 5, wherein at least a first one of the angle-based thresholds relates to the eye openness measure.
7. A method as recited in any of examples 1 through 6, wherein at least a second one of the angle-based thresholds relates to a head orientation of the driver.
8. A method as recited in any of examples 1 through 7, wherein:
   at least one of the time-based thresholds relates to driver reaction time;
   at least a first one of the angle-based thresholds relates to the eye openness measure; and
   at least a second one of the angle-based thresholds relates to a head orientation of the driver.
9. A method as recited in any of examples 1 through 8, further comprising dynamically updating the plurality of thresholds while the driver is operating the vehicle.
10. A method as recited in any of examples 1 through 9, wherein computing the eye openness measure of the eye of the driver comprises:
    generating an upper eyelid contour of the eye and a lower eyelid contour of the eye based on the image data representing images of the eye;
    identifying a plurality of landmarks on each of the upper eyelid contour and the lower eyelid contour;
    defining a plurality of triangles, such that each of the plurality of triangles has vertices formed by a different 3-tuple of landmarks among the plurality of landmarks;
    computing interior angles of the plurality of triangles; and
    computing the eye openness measure of the eye as a function of the interior angles.
11. A method as recited in any of examples 1 through 10, wherein two of the three vertices of each triangle are located on a different one of the upper eyelid contour and the lower eyelid contour than the third vertex of the triangle.
12. A method as recited in any of examples 1 through 9, wherein computing an eye openness measure of the eye of the driver comprises:
    obtaining landmark data of the eye;
    generating an upper eyelid contour of the eye and a lower eyelid contour of the eye based on the landmark data;
    plotting a first line between a first intersection point of the upper eyelid contour and the lower eyelid contour and a second intersection point of the upper eyelid contour and the lower eyelid contour;
    dividing the first line into at least four equal segments;
    plotting a plurality of second lines, wherein each of the plurality of second lines passes through an intersection point between a different two of the at least four equal segments of the first line, perpendicularly to the first line;
    identifying a plurality of landmarks on each of the upper eyelid contour and the lower eyelid contour, the plurality of landmarks comprising each intersection point between a line of the plurality of second lines and either the upper eyelid contour or the lower eyelid contour;
    defining a plurality of triangles, such that each of the plurality of triangles has vertices formed by a different 3-tuple of landmarks among the plurality of landmarks, wherein two of the landmarks in each said 3-tuple are located on a different one of the upper eyelid contour and the lower eyelid contour than the third landmark in the 3-tuple;

computing each interior angle of each of the plurality of triangles; and computing the eye openness measure of the eye as a function of the average of all of the interior angles of the plurality of angles.

13. A method as recited in any of examples 1 through 12, further comprising:

detecting a prolonged partial eye closure based on a head orientation angle and an eye state of the eye.

14. A method as recited in any of examples 1 through 13, further comprising:

calculating an eye behavior trend for the driver based on detected eye closure and microsleep patterns of the driver.

15. A non-transitory machine-readable storage medium having instructions stored thereon, execution of which by a processing system in a vehicle causes the processing system to perform a process comprising:

obtaining image data representing images of an eye of a driver of the vehicle, the images having been captured while the driver is operating the vehicle;

computing an eye openness measure of the eye of the driver, based on the image data;

determining that the driver is in an unsafe state for driving based on the eye openness measure; and generating an alert, while the driver is operating the vehicle, based on determining that the driver is in the unsafe state.

16. A non-transitory machine-readable storage medium as recited in example 15, wherein computing an eye openness measure of the eye of the driver comprises determining an eye state for the eye, and wherein the eye state is from the set of eye states consisting of: a fully open state, a partially open state, and a closed state.

17. A non-transitory machine-readable storage medium as recited in example 15 or example 16, said process further comprising:

determining a parameter set based on the eye state, the parameter set including at least one of a blink count, blink rate, eye closure duration, eye open duration, speed of eyelid closure, or speed of eyelid opening; and applying at least one parameter of the parameter set to a threshold or profile to identify an amount of deviation.

18. A non-transitory machine-readable storage medium as recited in any of examples 15 through 17, said process further comprising:

determining a plurality of thresholds;

wherein said determining that the driver is in an unsafe state for driving comprises applying acquired or computed data to the plurality of thresholds, and wherein the plurality of thresholds includes a plurality of time-based thresholds and a plurality of angle-based thresholds.

19. A non-transitory machine-readable storage medium as recited in any of examples 15 through 18, wherein:

at least one of the time-based thresholds relates to driver reaction time;

at least a first one of the angle-based thresholds relates to the eye openness measure; and at least a second one of the angle-based thresholds relates to a head orientation of the driver.

20. A non-transitory machine-readable storage medium as recited in any of examples 15 through 19, wherein computing the eye openness measure of the eye of the driver comprises:

generating an upper eyelid contour of the eye and a lower eyelid contour of the eye based on the image data representing images of the eye;

identifying a plurality of landmarks on each of the upper eyelid contour and the lower eyelid contour;

defining a plurality of triangles, such that each of the plurality of triangles has vertices formed by a different 3-tuple of landmarks among the plurality of landmarks;

computing interior angles of the plurality of triangles; and computing the eye openness measure of the eye as a function of the interior angles.

21. A system for monitoring driver alertness in a vehicle, the system comprising:

a camera to capture image data representing images of an eye of a driver of the vehicle while the driver is operating the vehicle;

an output device; and a processing subsystem, coupled to the camera and the output device, to receive the image data from the camera;

compute an eye openness measure of the eye of the driver, based on the image data;

determine that the driver is in an unsafe state for driving based on the eye openness measure;

generate an alert, while the driver is operating the vehicle, based on determining that the driver is in the unsafe state; and cause the output device to output to the driver a signal indicative of the alert.

22. A system as recited in example 21, wherein to compute an eye openness measure of the eye of the driver comprises to determine an eye state for the eye, and wherein the eye state is from the set of eye states consisting of: a fully open state, a partially open state and a closed state.

23. A system as recited in example 21 or example 22, wherein the processing subsystem further is to:

determine a parameter set based on the eye state, the parameter set including at least one of a blink count, blink rate, eye closure duration, eye open duration, speed of eyelid closure or speed of eyelid opening; and apply at least one parameter of the parameter set to a threshold or profile to identify an amount of deviation.

24. A system as recited in any of examples 21 through 23, wherein the processing subsystem further is to:

determine a plurality of thresholds;

wherein to determine that the driver is in an unsafe state for driving comprises to apply acquired or computed data to the plurality of thresholds, and wherein the plurality of thresholds include a plurality of time-based thresholds and a plurality of angle-based thresholds.

25. A system as recited in any of examples 21 through 24, wherein:

at least one of the time-based thresholds relates to driver reaction time;

at least a first one of the angle-based thresholds relates to the eye openness measure; and at least a second one of the angle-based thresholds relates to a head orientation of the driver.

26. A system as recited in any of examples 21 through 25, wherein the processing subsystem further is to update the plurality of thresholds while the driver is operating the vehicle.

27. A system as recited in any of examples 21 through 26, wherein to compute the eye openness measure of the eye of the driver comprises:

generating an upper eyelid contour of the eye and a lower eyelid contour of the eye based on the image data representing images of the eye;
identifying a plurality of landmarks on each of the upper eyelid contour and the lower eyelid contour;
defining a plurality of triangles, such that each of the plurality of triangles has vertices formed by a different 3-tuple of landmarks among the plurality of landmarks;
computing interior angles of the plurality of triangles; and
computing the eye openness measure of the eye as a function of the interior angles.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
    determining a plurality of thresholds including a plurality of time-based thresholds and a plurality of angle-based thresholds;
    obtaining image data representing images of an eye of a driver, the images having been captured while the driver is operating a vehicle;
    computing an eye openness measure of the eye of the driver, based on the image data;
    determining that the driver is in an unsafe state for driving based on the eye openness measure,
        wherein said determining comprises applying obtained or computed data to the plurality of thresholds; and
    generating an alert, while the driver is operating the vehicle, based on determining that the driver is in the unsafe state.

2. The method as recited in claim 1, wherein computing an eye openness measure of the eye of the driver comprises determining an eye state for the eye, and wherein the eye state is from a set of eye states consisting of: a fully open state, a partially open state, and a closed state.

3. The method as recited in claim 2, further comprising:
    determining a parameter set based on the eye state, the parameter set including at least one of a blink count, blink rate, eye closure duration, eye open duration, speed of eyelid closure, or speed of eyelid opening; and
    applying at least one parameter of the parameter set to a threshold or profile to identify an amount of deviation.

4. The method as recited in claim 1, wherein at least one of the time-based thresholds relates to driver reaction time.

5. The method as recited in claim 1, wherein at least a first one of the angle-based thresholds relates to the eye openness measure.

6. The method as recited in claim 1, wherein at least a second one of the angle-based thresholds relates to a head orientation of the driver.

7. The method as recited in claim 1, wherein:
    at least one of the time-based thresholds relates to driver reaction time;
    at least a first one of the angle-based thresholds relates to the eye openness measure; and
    at least a second one of the angle-based thresholds relates to a head orientation of the driver.

8. The method as recited in claim 1, further comprising dynamically updating the plurality of thresholds while the driver is operating the vehicle.

9. The method as recited in claim 1, wherein computing the eye openness measure of the eye of the driver comprises:
    generating an upper eyelid contour of the eye and a lower eyelid contour of the eye based on the image data representing images of the eye;
    identifying a plurality of landmarks on each of the upper eyelid contour and the lower eyelid contour;
    defining a plurality of triangles, such that each of the plurality of triangles has vertices formed by a different 3-tuple of landmarks among the plurality of landmarks;
    computing interior angles of the plurality of triangles; and
    computing the eye openness measure of the eye as a function of the interior angles.

10. The method as recited in claim 6, wherein two of the three vertices of each triangle are located on a different one of the upper eyelid contour and the lower eyelid contour than the third vertex of the triangle.

11. The method as recited in claim 1, wherein computing an eye openness measure of the eye of the driver comprises:
obtaining landmark data of the eye;
generating an upper eyelid contour of the eye and a lower eyelid contour of the eye based on the landmark data;
plotting a first line between a first intersection point of the upper eyelid contour and the lower eyelid contour and a second intersection point of the upper eyelid contour and the lower eyelid contour;
dividing the first line into at least four equal segments;
plotting a plurality of second lines, wherein each of the plurality of second lines passes through an intersection point between a different two of the at least four equal segments of the first line, perpendicularly to the first line;
identifying a plurality of landmarks on each of the upper eyelid contour and the lower eyelid contour, the plurality of landmarks comprising each intersection point between a line of the plurality of second lines and either the upper eyelid contour or the lower eyelid contour;
defining a plurality of triangles, such that each of the plurality of triangles has vertices formed by a different 3-tuple of landmarks among the plurality of landmarks, wherein two of the landmarks in each said 3-tuple are located on a different one of the upper eyelid contour and the lower eyelid contour than the third landmark in the 3-tuple;
computing each interior angle of each of the plurality of triangles; and
computing the eye openness measure of the eye as a function of the average of all of the interior angles of the plurality of angles.

12. The method as recited in claim 1, further comprising:
detecting a prolonged partial eye closure based on a head orientation angle and an eye state of the eye.

13. The method as recited in claim 1, further comprising:
calculating an eye behavior trend for the driver based on detected eye closure and microsleep patterns of the driver.

14. A non-transitory machine-readable storage medium having instructions stored thereon, execution of which by a processing system in a vehicle causes the processing system to perform a process comprising:
determining a plurality of thresholds including a plurality of time-based thresholds and a plurality of angle-based thresholds:
obtaining image data representing images of an eye of a driver of the vehicle, the images having been captured while the driver is operating the vehicle;
computing an eye openness measure of the eye of the driver, based on the image data;
determining that the driver is in an unsafe state for driving based on the eye openness measure,
wherein said determining comprises applying obtained or computed data to the plurality of thresholds; and
generating an alert, while the driver is operating the vehicle, based on determining that the driver is in the unsafe state.

15. The non-transitory machine-readable storage medium as recited in claim 14, wherein computing an eye openness measure of the eye of the driver comprises determining an eye state for the eye, and wherein the eye state is from a set of eye states consisting of: a fully open state, a partially open state, and a closed state.

16. The non-transitory machine-readable storage medium as recited in claim 15, said process further comprising:
determining a parameter set based on the eye state, the parameter set including at least one of a blink count, blink rate, eye closure duration, eye open duration, speed of eyelid closure, or speed of eyelid opening; and
applying at least one parameter of the parameter set to a threshold or profile to identify an amount of deviation.

17. The non-transitory machine-readable storage medium as recited in claim 14, wherein:
at least one of the time-based thresholds relates to driver reaction time;
at least a first one of the angle-based thresholds relates to the eye openness measure; and
at least a second one of the angle-based thresholds relates to a head orientation of the driver.

18. The non-transitory machine-readable storage medium as recited in claim 14, wherein computing the eye openness measure of the eye of the driver comprises:
generating an upper eyelid contour of the eye and a lower eyelid contour of the eye based on the image data representing images of the eye;
identifying a plurality of landmarks on each of the upper eyelid contour and the lower eyelid contour;
defining a plurality of triangles, such that each of the plurality of triangles has vertices formed by a different 3-tuple of landmarks among the plurality of landmarks;
computing interior angles of the plurality of triangles; and
computing the eye openness measure of the eye as a function of the interior angles.

19. A system for monitoring driver alertness in a vehicle, the system comprising:
a camera to capture image data representing images of an eye of a driver of the vehicle while the driver is operating the vehicle;
an output device; and
a processing subsystem, coupled to the camera and the output device, to;
determine a plurality of thresholds including a plurality of time-based thresholds and a plurality of angle-based thresholds:
receive the image data from the camera;
compute an eye openness measure of the eye of the driver, based on the image data;
determine that the driver is in an unsafe state for driving based on the eye openness measure,
wherein to determine comprises to apply received or computed data to the plurality of thresholds;
generate an alert, while the driver is operating the vehicle, based on determining that the driver is in the unsafe state; and
cause the output device to output to the driver a signal indicative of the alert.

20. The system as recited in claim 19, wherein to compute an eye openness measure of the eye of the driver comprises to determine an eye state for the eye, and wherein the eye state is from a set of eye states consisting of: a fully open state, a partially open state and a closed state.

21. The system as recited in claim 20, wherein the processing subsystem further is to:
determine a parameter set based on the eye state, the parameter set including at least one of a blink count, blink rate, eye closure duration, eye open duration, speed of eyelid closure or speed of eyelid opening; and
apply at least one parameter of the parameter set to a threshold or profile to identify an amount of deviation.

22. The system as recited in claim 19, wherein:
at least one of the time-based thresholds relates to driver reaction time;
at least a first one of the angle-based thresholds relates to the eye openness measure; and
at least a second one of the angle-based thresholds relates to a head orientation of the driver.

23. The system as recited in claim 19, wherein the processing subsystem further is to update the plurality of thresholds while the driver is operating the vehicle.

24. The system as recited in claim 19, wherein to compute the eye openness measure of the eye of the driver comprises:
generating an upper eyelid contour of the eye and a lower eyelid contour of the eye based on the image data representing images of the eye;
identifying a plurality of landmarks on each of the upper eyelid contour and the lower eyelid contour;
defining a plurality of triangles, such that each of the plurality of triangles has vertices formed by a different 3-tuple of landmarks among the plurality of landmarks;
computing interior angles of the plurality of triangles; and
computing the eye openness measure of the eye as a function of the interior angles.

* * * * *